(12) United States Patent
Inoue

(10) Patent No.: US 9,346,104 B2
(45) Date of Patent: May 24, 2016

(54) CUTTING INSERT, CUTTING TOOL, AND METHOD OF PRODUCING MACHINED PRODUCT USING THEM

(71) Applicant: KYOCERA CORPORATION, Kyoto-shi, Kyoto (JP)

(72) Inventor: Yoshihiro Inoue, Omihaciman (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 14/412,207

(22) PCT Filed: Jul. 26, 2013

(86) PCT No.: PCT/JP2013/070307
§ 371 (c)(1),
(2) Date: Dec. 31, 2014

(87) PCT Pub. No.: WO2014/017623
PCT Pub. Date: Jan. 30, 2014

(65) Prior Publication Data
US 2015/0158088 A1  Jun. 11, 2015

(30) Foreign Application Priority Data

Jul. 26, 2012 (JP) .................................. 2012-166384
Feb. 28, 2013 (JP) .................................. 2013-038415

(51) Int. Cl.
*B23C 5/02* (2006.01)
*B23B 27/14* (2006.01)
(Continued)

(52) U.S. Cl.
CPC ............. *B23B 27/141* (2013.01); *B23B 27/045* (2013.01); *B23B 27/143* (2013.01);
(Continued)

(58) Field of Classification Search
CPC .... B23B 27/22; B23B 27/143; B23B 27/045; B23B 27/16; B23B 27/32; B23B 220/321; B23B 220/3627; B23B 220/12; B23B 220/049; Y10T 82/10; Y10T 407/2268; Y10T 407/235

USPC .......................................... 82/1.11; 407/113
See application file for complete search history.

(56) References Cited

U.S. PATENT DOCUMENTS 4,832,541 A    5/1989  Noguchi et al.
7,488,143 B2 * 2/2009  Muren .................. B23B 27/007
                                                           407/113

(Continued)

FOREIGN PATENT DOCUMENTS

JP    S63186506 U    11/1988
JP    S6456904 U     4/1989
(Continued)

OTHER PUBLICATIONS

International Search Report issued on Aug. 8, 2013 in the corresponting International Application No. PCT/JP2013/070307.
(Continued)

*Primary Examiner* — Will Fridie, Jr.

(57) ABSTRACT

A cutting insert includes an upper surface, a side surface having a front clearance surface, and an end cutting edge along an intersection of the upper and the front clearance surfaces. The upper surface includes an end rake surface inclined downward as departing from the end cutting edge, a pair of front protrusions that is located apart from the end cutting edge and are less apart from each other as departing from the end cutting edge, a rear protrusion further apart from the end cutting edge than the pair of front protrusions, and a pair of intermediate protrusions located between the front protrusions and the rear protrusion. Top portions of the pair of intermediate protrusions are respectively located between the front protrusions and the rear protrusion, and are higher than top portions of the front protrusions and a top portion of the rear protrusion.

14 Claims, 21 Drawing Sheets

(51) Int. Cl.
*B23B 27/04* (2006.01)
*B23C 5/16* (2006.01)

(52) U.S. Cl.
CPC ..... *B23B2200/049* (2013.01); *B23B 2200/081* (2013.01); *B23B 2200/121* (2013.01); *B23B 2200/369* (2013.01); *Y10T 82/10* (2015.01); *Y10T 407/22* (2015.01); *Y10T 407/24* (2015.01)

(56) References Cited

U.S. PATENT DOCUMENTS

| | | | | |
|---|---|---|---|---|
| 7,909,546 B2* | 3/2011 | Nada | ................... | B23B 27/065 407/113 |
| 8,573,905 B2* | 11/2013 | Hecht | ................... | B23C 5/06 407/113 |
| 8,777,524 B2* | 7/2014 | Choi | ................... | B23C 5/109 407/113 |
| 8,905,686 B2* | 12/2014 | Hausmann | ................ | B23C 27/00 407/113 |
| 9,168,588 B2* | 10/2015 | Kaufmann | ............ | B23B 27/10 |
| 2007/0071559 A1* | 3/2007 | Koskinen | ................. | B23B 7/16 407/34 |
| 2010/0067992 A1* | 3/2010 | Uchijo | ................ | B23B 27/007 407/100 |
| 2011/0182680 A1* | 7/2011 | Cohen | ................. | B23B 27/007 407/102 |
| 2013/0183109 A1* | 7/2013 | Fujii | .................. | B23B 27/045 407/100 |
| 2013/0294854 A1* | 11/2013 | Lee | ................. | B23B 27/16 407/101 |

FOREIGN PATENT DOCUMENTS

| | | |
|---|---|---|
| JP | H02106204 A | 4/1990 |
| JP | H08071807 A | 3/1996 |
| JP | 2005103655 A | 4/2005 |
| JP | 2006150584 A | 6/2006 |
| JP | 2006272508 A | 10/2006 |
| WO | 2008053633 A1 | 5/2008 |

OTHER PUBLICATIONS

European Search Report issued in the corresponding European Patent Application No. 13823454.7 dated Mar. 1, 2016, 5 pages.

* cited by examiner

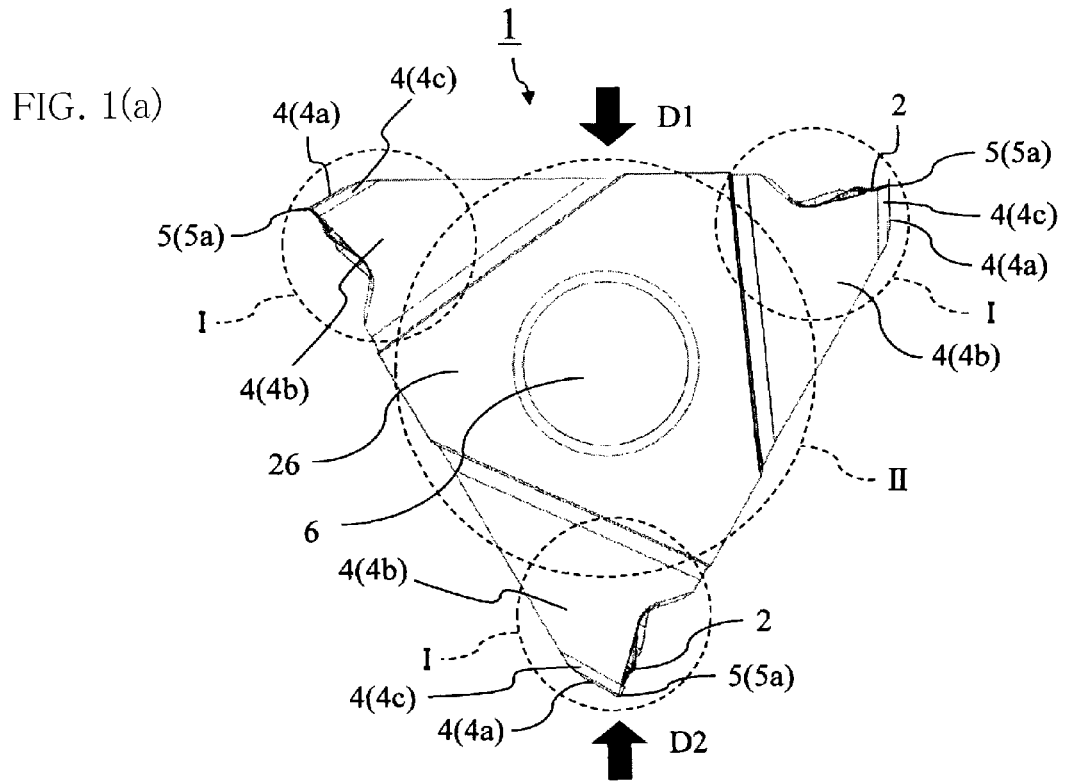
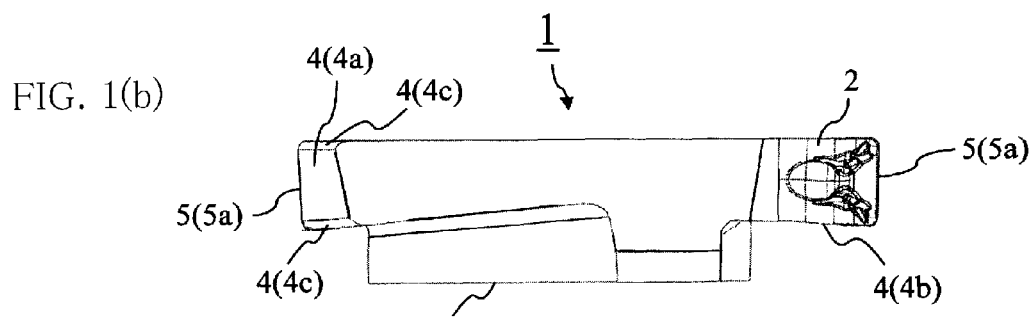
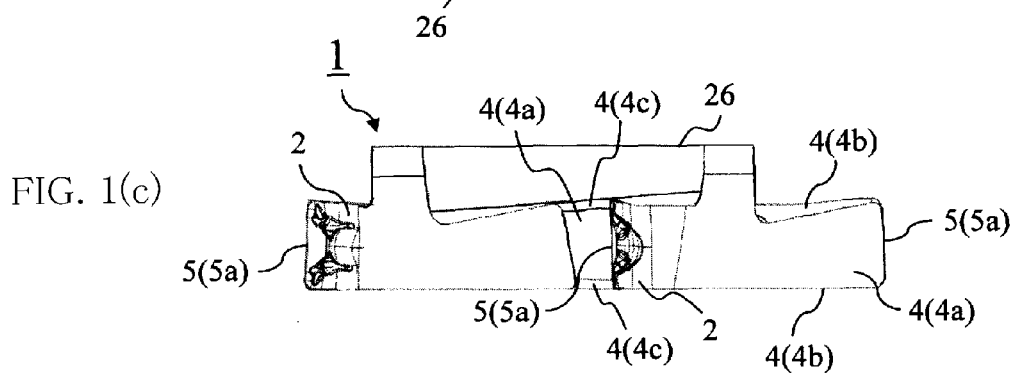
FIG. 1(a)
FIG. 1(b)
FIG. 1(c)

US 9,346,104 B2

CUTTING INSERT, CUTTING TOOL, AND METHOD OF PRODUCING MACHINED PRODUCT USING THEM

RELATED APPLICATIONS

The present application is a national stage entry according to 35 U.S.C. §371 of PCT application No.: PCT/JP2013/070307 filed on Jul. 26, 2013, which claims priorities from Japanese application Nos.: 2012-166384 filed on Jul. 26, 2012 and 2013-038415 filed Feb. 28, 2013, and is incorporated herein by reference in its entirety.

TECHNICAL FIELD

The present invention relates to a cutting insert, a cutting tool, and a method of producing a machined product using them.

BACKGROUND ART

Patent document 1 discloses a grooving tool as an example of cutting inserts usable for a grooving process or the like. As shown in FIGS. 14 to 16 of Patent document 1, the grooving tool is provided with a plurality of breaker projections, and the height of these breaker projections is increased stepwise as departing from an end flank surface. Specifically, the grooving tool described in Patent document 1 includes the first stage projection, the second stage projection, and the third stage projection that are sequentially located apart from the end flank surface. The height of these projections is increased stepwise.

However, when chips generated by the foregoing grooving tool climb over the first stage projection and the second stage projection, a rearward flow of the chips may be blocked by the collision of the chips with the third stage projection blocks. Consequently, the chips may stay between the first stage projection, the second stage projection, and the third stage projection. This is because the third stage projection is located behind the first stage projection and the second stage projection and has a larger height than these two projections.

Hence, there has been a need for excellent chip discharge performance in the cutting insert usable for the grooving process or the like.

Patent Document 1: Japanese Unexamined Patent Publication No. 2006-150584

SUMMARY OF THE INVENTION

A cutting insert according to one embodiment of the present invention includes an upper surface, a side surface including a front clearance surface and a pair of side clearance surfaces adjacent to the front clearance surface, an end cutting edge located along an intersection of the upper surface and the front clearance surface. The upper surface includes an end rake surface, a pair of front protrusions, a rear protrusion and a pair of intermediate protrusions. The end rake surface is continuous with the end cutting edge and is inclined downward as departing from the end cutting edge. The pair of front protrusions is located apart from the end cutting edge and is less apart from each other as departing from the end cutting edge in a top view. The rear protrusion is further apart from the end cutting edge than the pair of front protrusions in the top view, and is located in a region between the pair of front protrusions in a side view taken from the front clearance surface. The rear protrusion includes an ascent portion inclined upward as departing from the end cutting edge. The pair of intermediate protrusions is at least partially located between the pair of front protrusions and the rear protrusion in the top view. Top portions of the pair of intermediate protrusions are respectively located between the pair of front protrusions and the rear protrusion, and are higher than top portions of the front protrusions and a top portion of the rear protrusion.

BRIEF DESCRIPTION OF THE DRAWINGS

FIG. 1 is a general view showing a cutting insert according to a first embodiment of the present invention, specifically, FIG. 1(a) is a side view thereof, FIG. 1(b) is a plan view of the cutting insert taken in the direction of arrow D1 in FIG. 1(a), and FIG. 1(c) is a plan view of the cutting insert taken in the direction of arrow D2;

FIG. 2 is a partially enlarged view of the cutting insert shown in FIG. 1, specifically.

FIG. 3 is a general view showing a cutting insert according to a second embodiment of the present invention, specifically.

FIG. 5 is a cross-sectional view of the cutting insert shown in FIG. 4, specifically.

FIG. 7(a) is a cross-sectional view thereof taken along line A2-A2, FIG. 7(b) is a cross-sectional view thereof taken along line B2-B2, FIG. 7(c) is a cross-sectional view thereof taken along line C2-C2, FIG. 7(d) is a cross-sectional view thereof taken along line A3-A3, FIG. 7(e) is a cross-sectional view thereof taken along line B3-B3, and FIG. 7(f) is a cross-sectional view thereof taken along line D3-D3;

FIG. 9 is a drawing showing a second modification of the cutting insert shown in FIG. 1, specifically.

FIG. 12 is a cross-sectional view of the insert shown in FIG. 11, specifically.

FIG. 13 is a cross-sectional view of the insert shown in FIG. 11, specifically.

FIG. 14 is a general view showing a cutting tool according to a first embodiment of the present invention, specifically.

FIG. 17 is a general view of a cutting tool according to a second embodiment of the present invention, specifically.

PREFERRED EMBODIMENTS FOR CARRYING OUT THE INVENTION

Cutting Insert

First Embodiment

A cutting insert according to a first embodiment of the present invention is described in detail below with reference to FIGS. 1 and 2 and FIGS. 4 to 7.

FIG. 1 is a general view showing the cutting insert 1 according to the first embodiment of the present invention. Specifically, FIG. 1(a) is a side view thereof. FIG. 1(b) is a plan view of the cutting insert 1 taken in the direction of arrow D1 in FIG. 1(a). FIG. 1(c) is a plan view of the cutting insert 1 taken in the direction of arrow D2 in FIG. 1(a).

As shown in FIG. 1(a), the cutting insert 1 (hereinafter generally referred to simply as the insert 1) is an approximately triangular plate-shaped body, and is used in such an orientation that an approximately triangular portion defines a side clearance surface. The cutting insert 1 includes three cutting sections respectively located at corner portions thereof, and an attachment section II located at a middle portion thereof. The insert 1 of the present embodiment is applicable to, for example, an internal grooving process, an external grooving process, a cut-off process, a process for increasing a groove width, and a chamfering process.

For example, cemented carbide or cermet is usable as a material of the cutting insert 1. Examples of the composition of cemented carbide include WC—Co produced by adding cobalt (Co) powder to tungsten carbide (WC), followed by sintering, WC—TiC—Co produced by adding titanium carbide (TiC) to WC—Co alloy, and WC—TiC—TaC—Co produced by adding tantalum carbide (TaC) to WC—TiC—Co. The cermet is a sintered composite material obtained by compositing metal with a ceramic ingredient. Examples of the cermet include ones composed mainly of a titanium based compound, such as titanium carbide (TiC) and titanium nitride (TiN).

The surface of the cutting insert 1 formed of the foregoing material may be coated with a film by a chemical vapor deposition (CVD) method or a physical vapor deposition (PVD) method. Examples of the composition of the film to be coated include titanium carbide (TiC), titanium nitride (TiN), titanium carbonitride (TiCN), and alumina ($Al_2O_3$).

The size of the insert 1 is not particularly limited. In the present embodiment, a widthwise length of the insert 1 indicated by a vertical length in FIG. 1(b) is set to 1 to 8 mm, and a longitudinal length of the insert 1 indicated by a lateral length in FIG. 1(b) is set to approximately 10 to 15 mm.

Figure 2A:
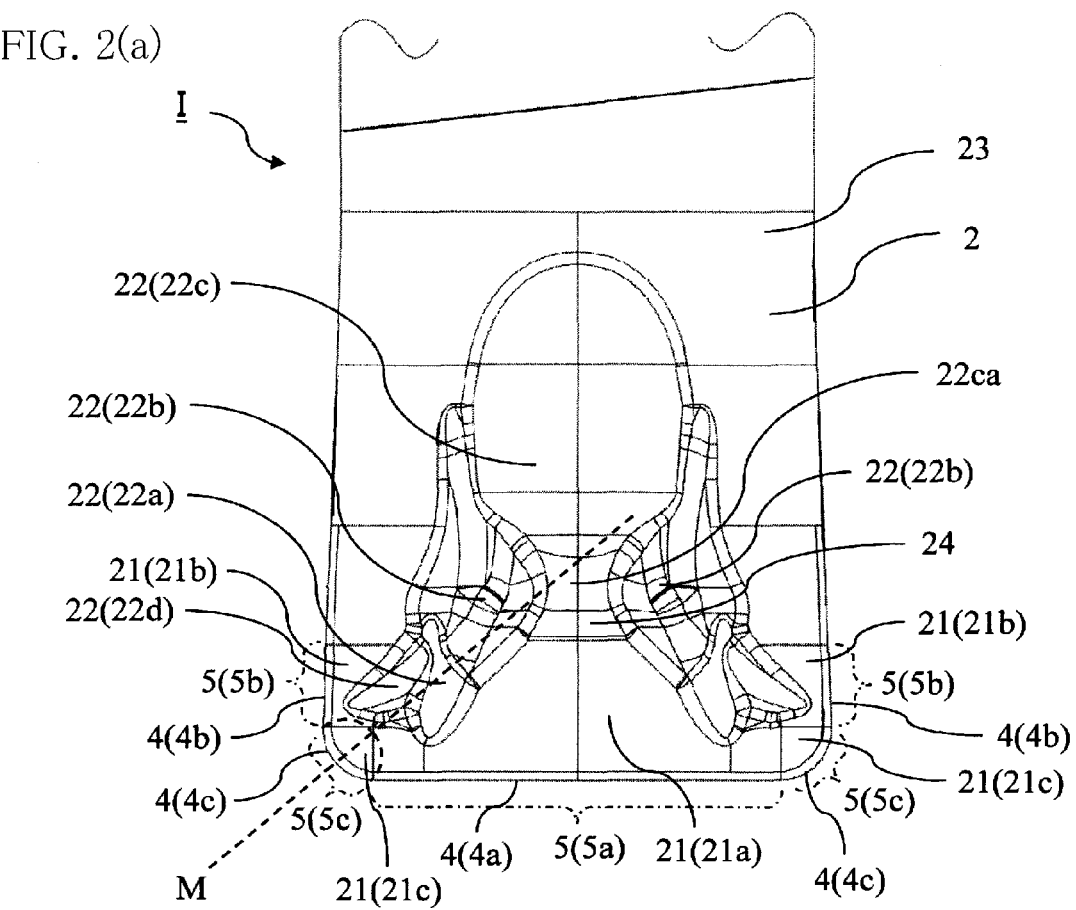
FIG. 2(a) is a top view thereof.
Figure 2B:
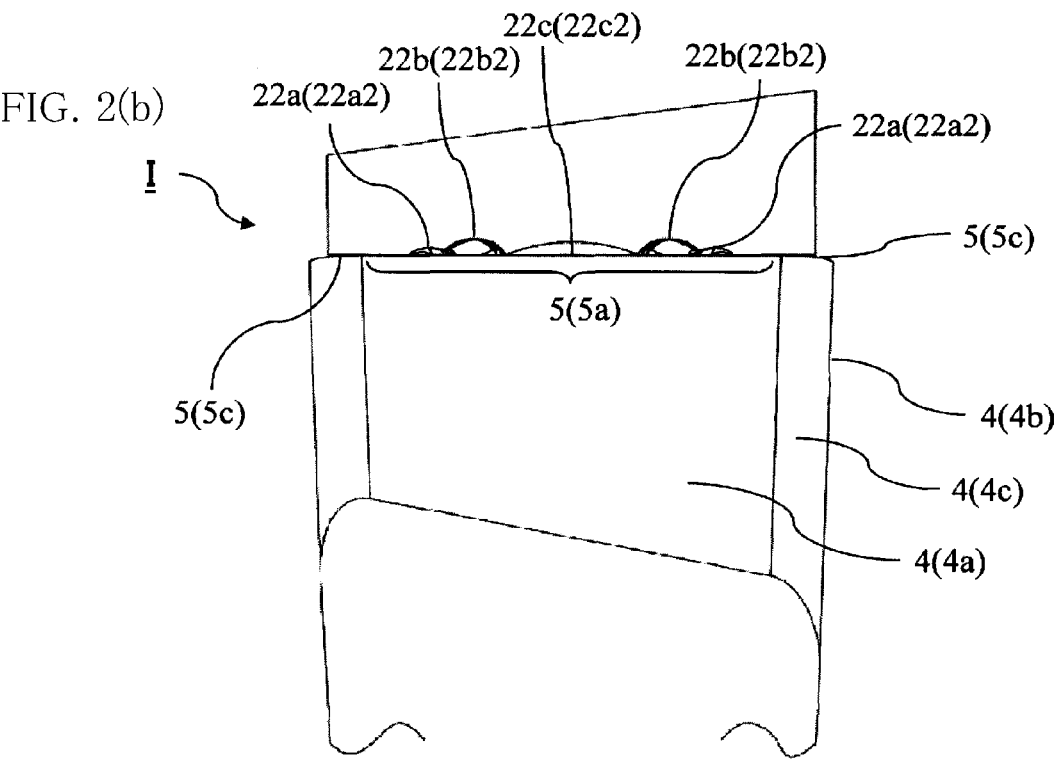
FIG. 2(b) is a side view (front view) thereof.

FIG. 2 is an enlarged view of the cutting sections I of the cutting insert 1 shown in FIG. 1(a). Specifically, FIG. 2(a) is a top view thereof, and FIG. 2(b) is a side view (front view) taken from a front clearance surface.

According to the present embodiment, each of the cutting sections I of the present embodiment includes an upper surface 2 and a side surface 4 connected to the upper surface 2 as shown in FIG. 2. A part of the upper surface 2 functions as a rake surface, and a part of the side surface 4 functions as a flank surface. The side surface 4 includes a front clearance surface 4a located close to the front, and a pair of side clearance surfaces 4b adjacent to the front clearance surface 4a. A pair of corner clearance surfaces 4c are respectively disposed between the front clearance surface 4a and the pair of side clearance surfaces 4b.

As shown in FIG. 1(a), the attachment section II includes a through hole 6 and an attachment surface 26 surrounding the circumference of the through hole 6. The attachment surface 26 of the attachment section II is adjacent to the side clearance surfaces 4b of the cutting section I. The through hole 6 functions as a hole that permits insertion of a screw. The attachment surface 26 is brought into contact with a holder upon attachment to the holder, and functions as a mounting surface to be mounted on the holder.

A cutting edge 5 is located along an intersection of the upper surface 2 and the side surface 4. The cutting edge 5 of the insert 1 of the present embodiment includes an end cutting edge 5a, a pair of side cutting edges 5b, and a pair of curvilinear corner cutting edges 5c as shown in FIG. 2. The end cutting edge 5a is located along a widthwise intersection of each of the cutting sections I, namely, an intersection of the upper surface 2 and the front clearance surface 4a. The pair of side cutting edges 5b is respectively located along intersections of the upper surface 2 and the pair of side clearance surfaces 4b. The pair of curvilinear corner cutting edges 5c is respectively located between the end cutting edge 5a and the pair of side cutting edges 5b, and connects the end cutting edge 5a and the pair of side cutting edges 5b. The pair of corner cutting edges 5c has a curvilinear shape in a top view.

In the grooving process and cut-off process, a workpiece is to be cut using mainly the end cutting edge 5a. As shown in FIG. 2(b), the end cutting edge 5a of the present embodiment has a straight line shape in a front view, namely, when viewed from the front clearance surface 4a. This ensures enhancement of the smoothness of, for example, a bottom surface of a groove to be formed on the workpiece during the grooving process.

The upper surface 2 includes a rake surface 21, a protrusion 22, and a rising surface 23 as shown in FIG. 2. The rake surface 21 is located inside the cutting edge 5. The protrusion 22 is located on the rake surface 21. The rising surface 23 is at least partially located further apart from the end cutting edge 5a than the protrusion 22, and is inclined upward as departing from the cutting edge 5a.

The upper surface 2 has the rake surface 21 inside the cutting edge 5 as shown in FIG. 2. The rake surface 21 has a role in guiding chips in a discharge direction while allowing the chips to slidingly pass therethrough. The rake surface 21 may include a land portion (not shown). The term "land portion" is the portion of each of the cutting sections T which extends along the cutting edge 5 on the upper surface 2, and corresponds to a narrow band-shaped region having an approximately constant width. The land portion contributes to improving the strength of the front end of the cutting edge 5 so as to suppress fracture of the cutting edge 5. The land portion may be parallel to a horizontal plane, or may be inclined downward as departing from the cutting edge 5.

In the present embodiment, the rake surface 21 includes an end rake surface 21a, a pair of side rake surfaces 21b, and a pair of corner rake surfaces 21c as shown in FIG. 2. The end rake surface 21a is continuous with the end cutting edge 5a, and is inclined downward as departing from the end cutting edge 5a. The pair of side rake surfaces 21b is respectively continuous with the pair of side cutting edges 5b, and is respectively inclined downward as departing from the pair of side cutting edges 5b. The pair of corner rake surfaces 21c is respectively located on opposite sides of the end rake surface 21a. The pair of corner rake surfaces 21c is respectively continuous with the pair of corner cutting edges 5c, and is respectively inclined downward as departing from the pair of corner cutting edges 5c.

The corner rake surfaces 21c are respectively inclined downward as departing from the corner cutting edges 5c over the entire region of the corner cutting edges Sc. A bisector M in FIG. 2(a) passes through the corner cutting edges 5c and the corner rake surfaces 21c. Here, the term "being inclined downward or upward" is to be determined on the basis of a state in which the insert 1 is mounted on the horizontal plane.

When it is difficult to mount the insert 1 alone on the horizontal plane, a determination may be made on the basis of a state in which a cutting tool with the insert 1 attached to the holder is mounted on the horizontal plane. In FIGS. 3(b), 5(a), and FIGS. 7(c) to 7(f) of the present application, a horizontal line parallel to the horizontal plane used for mounting is denoted by a reference character "L".

Figure 5A:
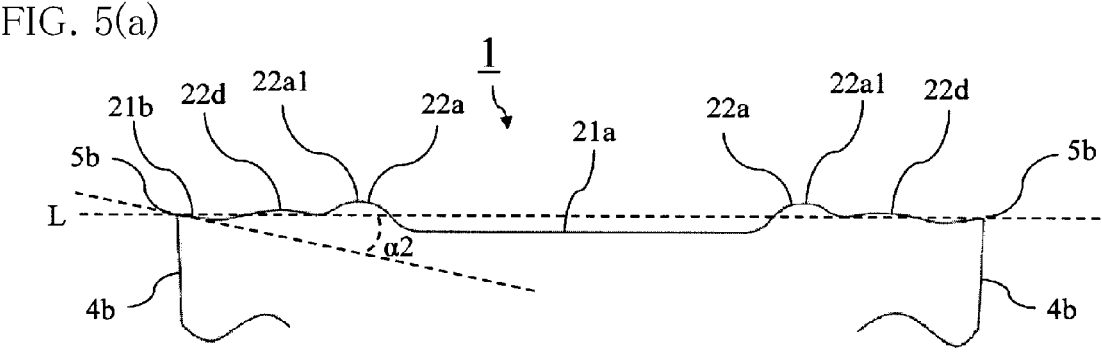
FIG. 5(a) is a cross-sectional view thereof taken along line A1-A1 in FIG. 4.

In the present embodiment, a rake angle $\alpha1$ of the end rake surface 21a is larger than a rake angle of the corner rake surface 21c and a rake angle $\alpha2$ of the side rake surface 21b. The rake angle $\alpha1$ of the end rake surface 21a is shown in FIG. 7(c). The rake angle $\alpha2$ of the side rake surface 21b is shown in FIG. 5(a). The rake angle of the corner rake surface 21c is larger than the rake angle $\alpha2$. For example, the rake angle $\alpha1$ is set to 5 to 20°, and the rake angle $\alpha2$ is set to 0 to 15°. The rake angle of the corner rake surface 21c is set to, for example, 8 to 20°.

Each of the rake angles of the end rake surface 21a and the corner rake surfaces 21c is not constant, and setting is made so that each of these rake angles in a boundary portion of the end rake surface 21a and the corner rake surface 21c reaches a maximum. Setting is also made so that the rake angle decreases as going from the boundary portion to the side rake surfaces 21b.

The rake angle $\alpha2$ decreases as departing from the end cutting edge 5a. As shown in FIG. 2, the pair of side rake surfaces 21b is located closer to the end cutting edge 5a than a rear protrusion 22c in the top view.

Figure 4:
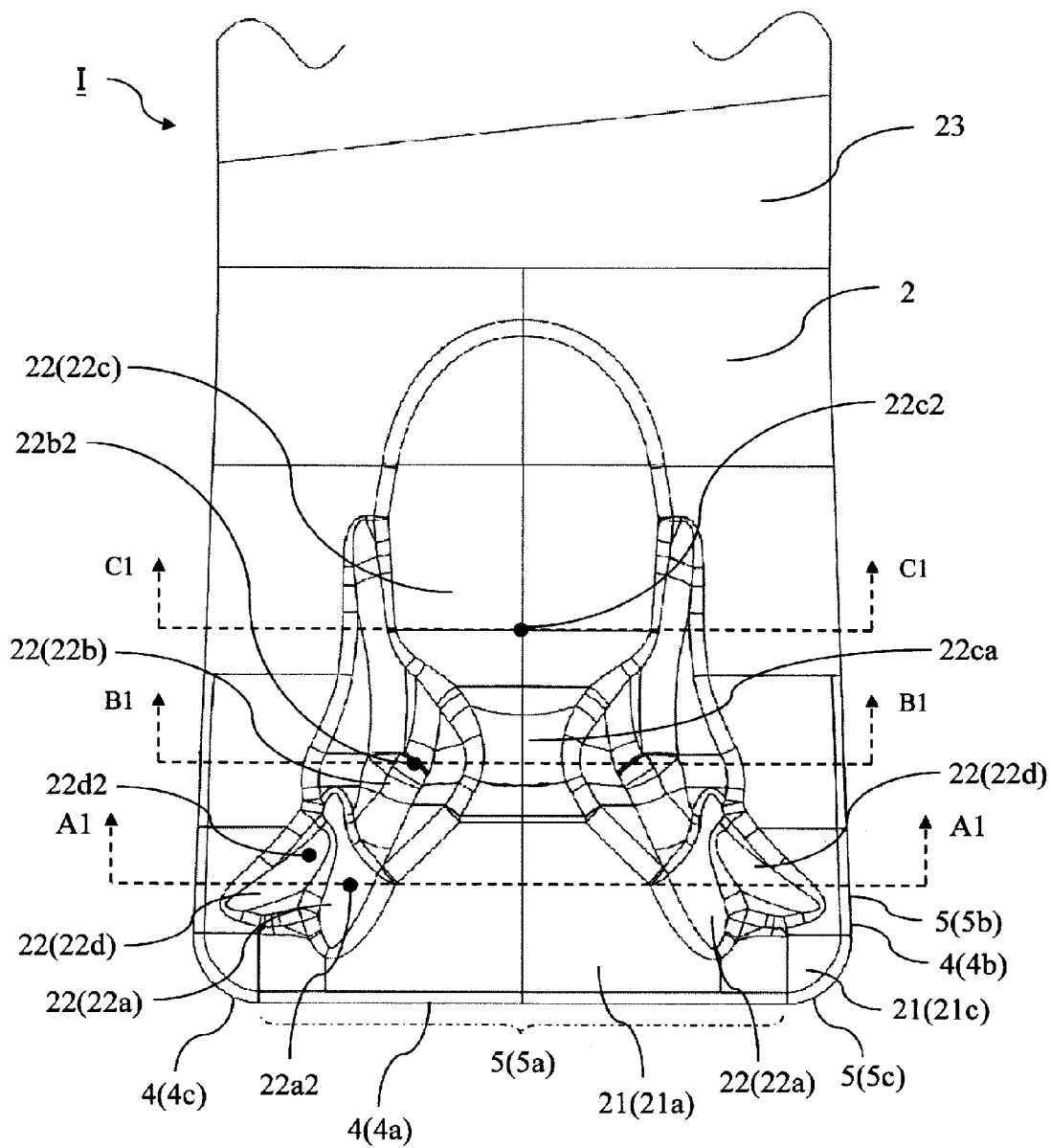
FIG. 4 is a partially enlarged top view of the cutting insert shown in FIG. 1, namely, the top view showing the same region as in FIG. 2(a)
Figure 5B:
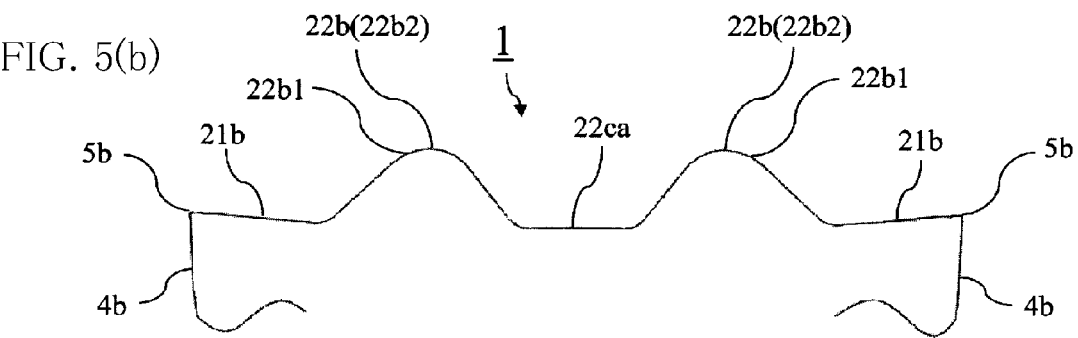
FIG. 5(b) is a cross-sectional view thereof taken along line B1-B1 in FIG. 4.
Figure 5C:
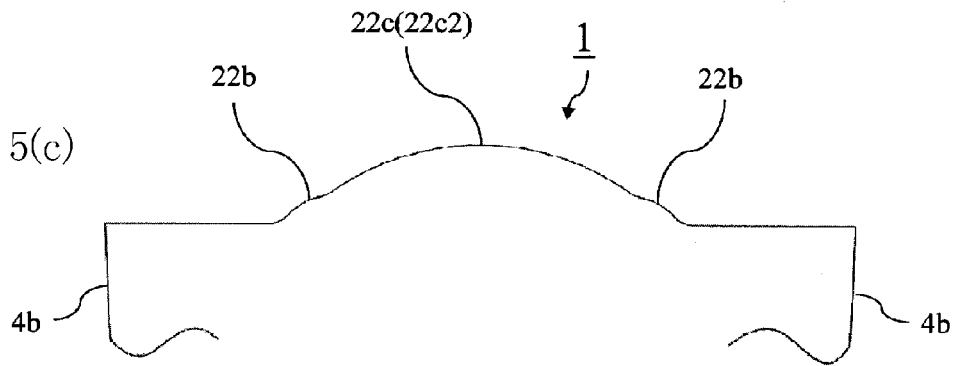
FIG. 5(c) is a cross-sectional view thereof taken along line C1-C1 in FIG. 4.

FIG. 4 is a partially enlarged top view of the cutting insert shown in FIG. 1. FIG. 4 shows the same region as the region shown in FIG. 2(a). Some of reference numerals shown in FIG. 2(a) are omitted in FIG. 4. FIG. 5 is a cross-sectional view of the cutting insert 1 shown in FIG. 4. Specifically, FIG. 5(a) is a cross-sectional view taken along line A1-A1 in FIG. 4. FIG. 5(b) is a cross-sectional view taken along line B1-B1 in FIG. 4. FIG. 5(c) is a cross-sectional view taken along line C1-C1 in FIG. 4.

The upper surface 2 have the protrusions 22 on the rake surface 21. The protrusions 22 have a role in deforming chips, and also cooperate with the rake surface 21 to guide the chips in the discharge direction.

In the present embodiment, the protrusions 22 includes a pair of front protrusions 22a, the rear protrusion 22c, a pair of intermediate protrusions 22b, and a pair of minor protrusions 22d as shown in FIG. 2. The pair of front protrusions 22a is located apart from the end cutting edge 5a and is less apart from each other as departing from the end cutting edge 5a in the top view.

The rear protrusion 22c is located further apart from the end Cutting edge 5a than the pair of front protrusions 22a in the top view, and is located in a region between the pair of front protrusions 22a in a side view from the front clearance surface 4a. The rear protrusion 22c includes an ascent portion 22ca inclined upward as departing from the end cutting edge 5a. The pair of intermediate protrusions 22b is located so as to connect the pair of front protrusions 22a and the rear protrusion 22c. Accordingly, the pair of intermediate protrusions 22b is respectively at least partially located between the pair of front protrusions 22a and the rear protrusion 22c.

The pair of minor protrusions 22d is located close to their adjacent side clearance surface 4b of the pair of side clearance surfaces 4b with respect to the pair of front protrusions 22a as shown in FIGS. 2, 4, and 5(a). In other words, the pair of minor protrusions 22d is respectively located between the pair of front protrusions 22a and the pair of side clearance surfaces 4b.

In the present embodiment, as shown in FIGS. 4 and 5(a), top portions 22b2 of the pair of intermediate protrusions 22b are respectively located between the pair of front protrusions 22a and the rear protrusion 22c, and are located higher than top portions 22a2 of the pair of front protrusions 22a and a top portion 22c2 of the rear protrusion 22c.

Thus, the pair of front protrusions 22a, the pair of intermediate protrusions 22b and the rear protrusion 22c are sequentially located as departing from the end cutting edge 5a on the upper surface 2. Furthermore, the top portions 22b2 of the pair of intermediate protrusions 22b are respectively located between the pair of front protrusions 22a and the rear protrusion 22c, and are higher than the top portions 22a2 of the pair of front protrusions 22a and the top portion 22c2 of the rear protrusion 22c.

With this configuration, when the workpiece is subjected to the grooving process and the cut-off process, the chips generated by the end cutting edge 5a are to be deformed upon contact with each of these protrusions 22 while passing through the end rake surface 21a. Consequently, the chips can be stably discharged to the outside under cutting conditions over a wide range of feed rates.

The chips generated by the end cutting edge 5a have a relatively small thickness under the cutting condition of low feed rate. Under this condition, the portions of the chips brought into contact with the pair of front protrusions 22a are upheaved and squeezed in the width direction of the chips. Consequently, the stiffness of the chips can be enhanced to ensure that the chips are stably discharged to the outside.

The chips generated by the end cutting edge 5a have a relatively large thickness under the cutting condition of high feed rate. Under this condition, even when the chips climb over the pair of front protrusions 22a, the chips are brought into contact with the pair of intermediate protrusions 22b higher than the front protrusions 22a, thereby enhancing the stiffness of the chips. Additionally, the contact of the chips with three points (three surfaces) of the pair of intermediate protrusions 22b and the rear protrusion 22c located behind the pair of intermediate protrusions 22b facilitates control of the flow of the chips, thus ensuring that the chips are stably discharged to the outside.

On this occasion, the top portion 22*c*2 of the rear protrusion 22*c* is lower than the top portions 22*b*2 of the pair of intermediate protrusions 22*b*. This minimizes the possibility that the chips are brought into contact with only the rear protrusion 22*c* without being brought into contact with the pair of front protrusions 22*a* and the pair of intermediate protrusions 22*b*. That is, the chips are apt to climb over the rear protrusion 22*c* and flow backward. This reduces the risk that the chips stay between the pair of intermediate protrusions 22*b* and the rear protrusion 22*c*, thus producing excellent chip discharge performance.

The chips after climbing over the rear protrusion 22*c* are brought into collision with the rising surface 23 located further backward so as to be curled and discharged. The distance from the end cutting edge 5*a* to the rising surface 23 is longer than the distance from the end cutting edge 5*a* to the rear protrusion 22*c*. This ensures a region for curling the chips in an area from the end cutting edge 5*a* to the rising surface 23. Therefore, the chips are to be stably curled between the rear protrusion 22*c* and the rising surface 23 so as to minimize the possibility that the chips stay therebetween.

Figure 6:
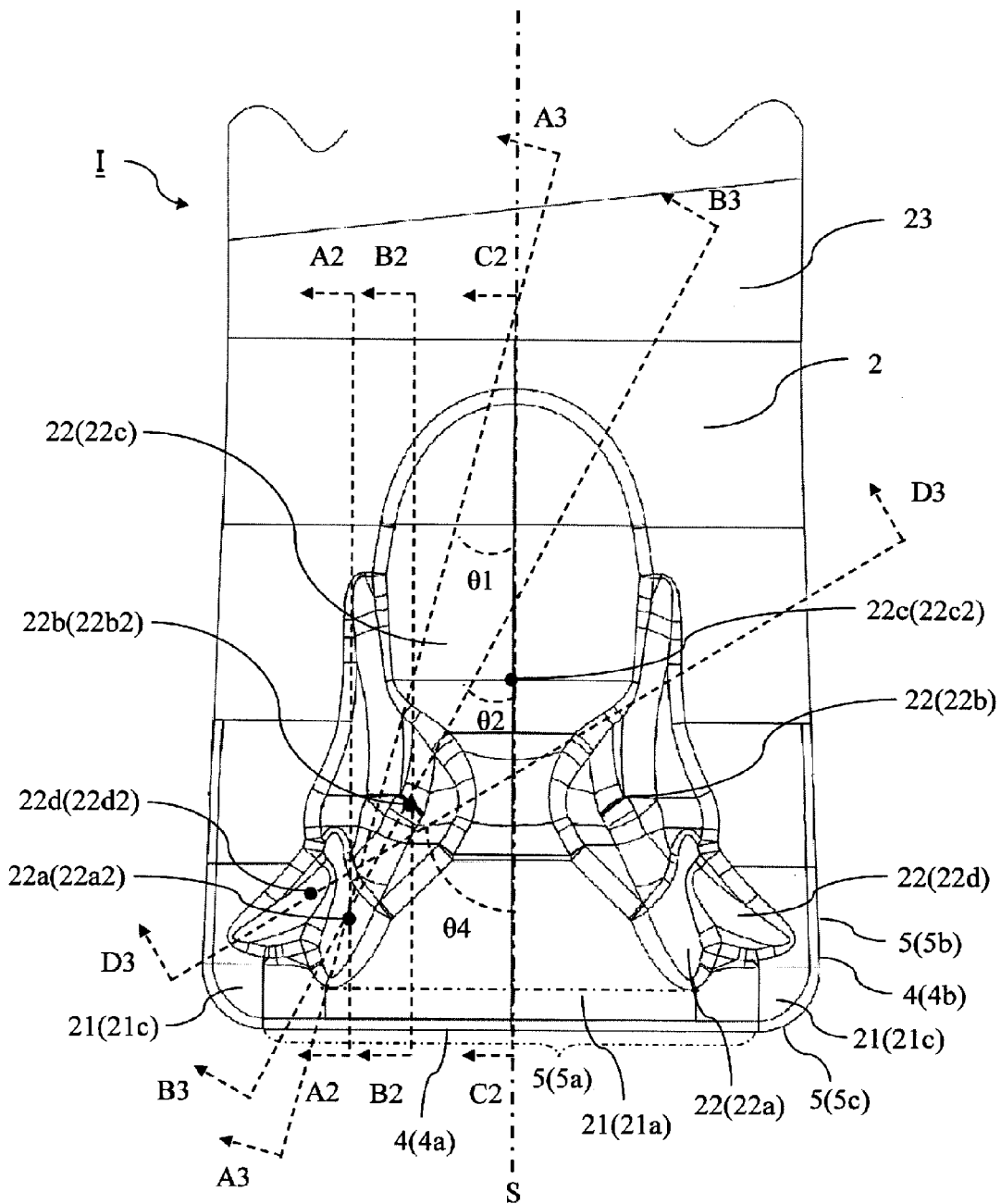
FIG. 6 is a partially enlarged top view of the cutting insert shown in FIG. 1, namely, the top view showing the same region as in FIG. 2(a)

In the present embodiment, as shown in FIG. 6, a first perpendicular line, a second perpendicular line, and a third perpendicular line are sequentially located from one end of the end cutting edge 5*a* (the left end portion in FIG. 6) to a middle part thereof in the top view. Here, the first perpendicular line is the perpendicular line (being overlapped with the line A2-A2) of the perpendicular lines of the end cutting edge 5*a* which passes through the top portions 22*a*2 of the pair of front protrusions 22*a*. The second perpendicular line is the perpendicular line (being overlapped with the line B2-B2) of the perpendicular lines of the end cutting edge 5*a* which passes through the top portions 22*b*2 of the pair of intermediate protrusions 22*b*. The third perpendicular line is the perpendicular line (being overlapped with the line C2-C2) of the perpendicular lines of the end cutting edge 5*a* which passes through the top portion 22*c*2 of the rear protrusion 22*c*.

Accordingly, the top portions of the individual protrusions 22 located sequentially as departing from the end cutting edge 5*a* are located sequentially from opposite ends of the end cutting edge 5*a* to the center thereof in a front view. This ensures that the chips are effectively deformed so as to be squeezed as departing from the end cutting edge 5*a*, thereby producing excellent chip discharge performance.

Further, as shown in FIG. 2(*b*), the top portions 22*b*2 of the pair of intermediate protrusions 22*b* are higher than the end cutting edge 5*a* in the front view. That is, the pair of intermediate protrusions 22*b* ensures a sufficient height with respect to a flow direction of the generated chips. Therefore, for example, even under the cutting condition of high feed rate, the chips become easily contacted with the pair of intermediate protrusions 22*b*, and consequently producing the excellent chips discharge performance.

In the present embodiment, the top portions of the pair of minor protrusions 22*d* are set to be lower than the end cutting edge 5*a*. Therefore, as shown in FIG. 2(*b*), the top portions of the pair of minor protrusions are invisible behind the front clearance surface 4*a* in the front view.

In the present embodiment, as shown in FIG. 2, the portions of the pair of front protrusions 22*a* which are protruded from the intermediate protrusions 22*b* toward the end cutting edge 5*a* are less apart from each other as departing from the end cutting edge 5*a*. Hence, the chips generated by the end cutting edge 5*a* are to be deformed so as to be squeezed by the pair of front protrusions 22*a* as departing from the end cutting edge 5*a*, thereby producing the excellent chip discharge performance.

Additionally in the present embodiment, the portions of the pair of minor protrusions 22*d* which are protruded from the front protrusions 22*a* toward the end cutting edge 5*a* are less apart from each other as departing from the end cutting edge 5*a*. Hence, the chips generated by the end cutting edge 5*a* are to be deformed so as to be squeezed by the pair of minor protrusions 22*d* as departing from the end cutting edge 5*a*.

Yet additionally in the present embodiment, the portions of the pair of intermediate protrusions 22*b* which are protruded from the rear protrusion 22*c* toward the end cutting edge 5*a* are less apart from each other as departing from the end cutting edge 5*a*. In other words, the distance between the pair of minor protrusions 22*d* is decreased as departing from the end cutting edge 5*a*. Hence, the chips generated by the end cutting edge 5*a* are to be deformed so as to be squeezed by the pair of intermediate protrusions 22*b* as departing from the end cutting edge 5*a*.

In addition to the above, as shown in FIG. 6, an inclination angle $\theta 4$ of the pair of minor protrusions 22*d* is larger than an inclination angle $\theta 1$ of the pair of front protrusions 22*a* with respect to a reference line S that is the perpendicular line of the end cutting edge 5*a* and passes through a midpoint of the end portions of the pair of front protrusions 22*a* which are close to the end cutting edge 5*a*, in the top view. An inclination angle $\theta 2$ of the pair of intermediate protrusions 22*b* is larger than the inclination angle $\theta 1$ of the pair of front protrusions 22*a* with respect to the reference line S in the top view.

Here, the inclination angle with respect to the reference line S is to be measured using a straight line connecting a bottom portion (which is closest to the cutting edge 5 and is the point to start an upward inclination) and a top portion (which is the position having the maximum height from the horizontal plane) of the protrusions 22*a*, 22*b*, and 22*d*. When the bottom portion and the top portion have a predetermined length in a direction parallel to the end cutting edge 5*a* in the top view, a measurement may be made using their respective midpoint. The measurement can be made similarly in FIG. 10 described later.

Figure 7:
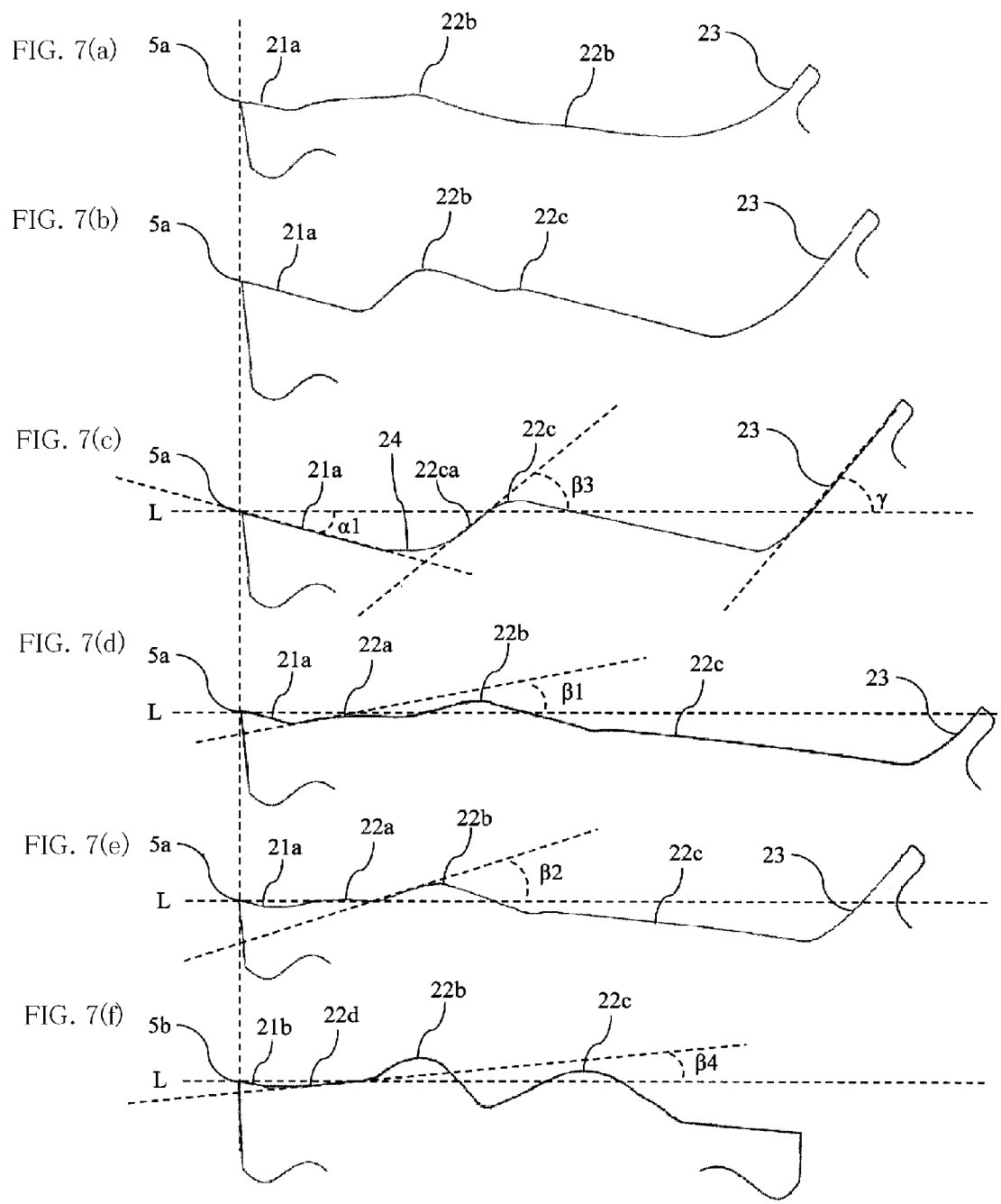
FIG. 7 is a cross-sectional view of the cutting insert shown in FIG. 6, specifically.

As shown in FIG. 7(*d*), the pair of front protrusions 22*a* is inclined upward at a climbing angle $\beta 1$ as departing from the end cutting edge 5*a*. The pair of intermediate protrusions 22*b* is inclined upward at a climbing angle $\beta 2$ as departing from the end cutting edge 5*a*. The climbing angle $\beta 1$ of the pair of front protrusions 22*a* is smaller than the climbing angle $\beta 2$ of the pair of intermediate protrusions 22*b* shown in FIG. 7(*e*).

The chips generated under the cutting condition of high feed rate have a relatively large thickness, and hence the chips may not be sufficiently deformed upon contact with the pair of front protrusions 22*a*. However, the climbing angle $\beta 2$ is larger than the climbing angle $\beta 1$, thus ensuring that the chips become more easily deformed on the pair of intermediate protrusions 22*b* than the pair of front protrusions 22*a*. Therefore even under the above-mentioned cutting condition, the chips are brought into contact with the pair of intermediate protrusions 22*b* located behind the pair of front protrusions 22*a*, thus allowing the chips to be effectively deformed.

The pair of front protrusions 22*a* in the present embodiment is continuous with the end rake surface 21*a* as shown in FIG. 2(*a*). Therefore, the chips generated by the end cutting edge 5*a* are satisfactorily deformable in a discharge process of the chips generated by the end cutting edge 5*a*. One end of the end rake surface 21*a*, specifically, the end portion of the end rake surface 21*a* which is most apart from the end cutting edge 5*a* extends to a position further apart from the end cutting edge 5*a* than the pair of front protrusions 22*a*.

The ascent portion 22ca of the rear protrusion 22c is located further apart from the end cutting edge 5a than the end rake surface 21a as shown in FIG. 2(a). A boundary region 24 of the end rake surface 21a and the ascent portion 22ca of the rear protrusion 22c is located between the pair of intermediate protrusions 22b in the top view. At least a part of the boundary region 24 is the plane parallel to the horizontal line.

In the present embodiment, the pair of minor protrusions 22d is located further apart from the end cutting edge 5a than the end portion of each of the pair of front protrusions 22a which is close to the end cutting edge 5a. The top portions 22d2 of the pair of minor protrusions 22d shown in FIG. 6 are lower than the top portions 22a2 of the pair of front protrusions 22a. The pair of minor protrusions 22d is inclined upward at a climbing angle β4 as shown in FIG. 7(f). The climbing angle β1 of the pair of front protrusions 22a is larger than the climbing angle β4 of the pair of minor protrusions 22d. For example, the climbing angle β1 of the pair of front protrusions 22a is settable to 10 to 15°, and the climbing angle β4 of the pair of minor protrusions 22d is settable to 5 to 10°.

As shown in FIG. 7(c), an inclination angle γ of the rising surface 23 is larger than a climbing angle β3 of the ascent portion 22ca of the rear protrusion 22c. For example, the climbing angle β3 of the ascent portion 22ca of the rear protrusion 22c is set to 20 to 40°. The inclination angle γ of the rising surface 23 is set to 40 to 60°.

The portions of the pair of front protrusions 22a which are opposed to each other (internal clearance surfaces) are configured in a planar shape or concave surface shape. These portions are in the planar shape in FIG. 5(a). The portions of the pair of intermediate protrusions 22b which are opposed to each other (internal clearance surfaces) are also configured in the planar shape or concave surface shape. These portions are in the planar shape in FIG. 5(b).

In the present embodiment, as shown in FIG. 2(a), at least a part of a bisector M of an angle formed by an extension line of the end cutting edge 5a and extension lines of the pair of side cutting edges 5b passes through between the pair of front protrusions 22a and the pair of minor protrusions 22d in the top view.

Second Embodiment

A cutting insert according to a second embodiment of the present invention is described in detail below with reference to FIG. 3.

In FIG. 3, the same components as in the foregoing FIGS. 1 and 2 are provided with identical reference numerals, and the descriptions thereof are generally omitted. The basic configuration of the cutting insert 1 of the present embodiment is the same as those of the cutting insert 1 of the first embodiment. Therefore, the following description is focused on differences from the cutting insert 1 of the first embodiment, and the descriptions of overlapping contents are omitted.

Figure 3A:
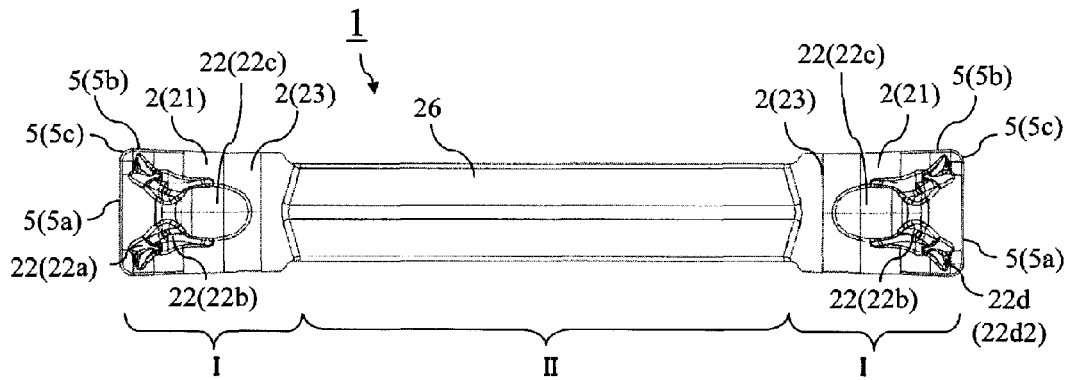
FIG. 3(a) is a top view thereof.
Figure 3B:
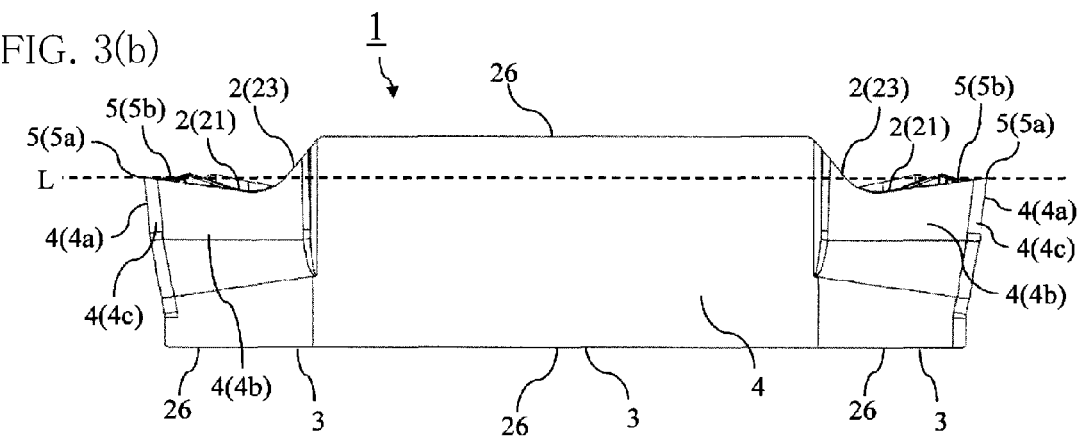
FIG. 3(b) is a side view taken in the width direction thereof.
Figure 3C:
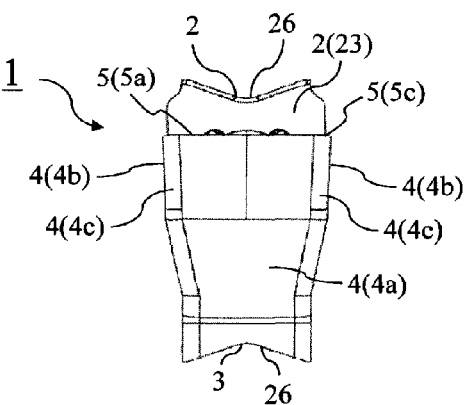
FIG. 3(c) is a side view (front view) taken in the longitudinal direction thereof.

FIGS. 3(a) to 3(c) are respectively drawings showing the cutting insert 1 according to the second embodiment of the present invention. FIG. 3(a) is a top view thereof, FIG. 3(b) is a side view taken in the width direction thereof, and FIG. 3(c) is a front view (side view taken in the longitudinal direction thereof).

The cutting insert 1 of the present embodiment has an approximately prismatic shape. Cutting sections I is respectively located at opposite end portions (left and right end portions in FIG. 3(a)) of the cutting insert 1. An attachment section II is located between these two cutting sections I. The attachment section II includes a clamp surface as an attachment surface 26 to be brought into contact with the holder when fixed by a clamp member of the holder. The insert 1 of the present embodiment is usable in a grooving process, a cut-off process, a traversing process, and a chamfering process. The grooving process includes both an internal grooving process and an external grooving process.

FIG. 2(a) is the enlarged plan view of the cutting sections I of the cutting insert 1 according to the first embodiment as described above, and is also the enlarged view of the cutting sections I of the cutting insert 1 according to the present embodiment.

In the present embodiment, each of the cutting sections II includes an upper surface 2, a lower surface 3, and a side surface 4 connected to the upper surface 2 and the lower surface 3. The upper surface 2 in the cutting sections I functions as a rake surface 21. The lower surface 3 functions as the clamp surface configured to be mounted on the holder. The side surface 4 functions as a flank surface.

Although the size of the insert 1 is not particularly limited, in the present embodiment, a widthwise length of the insert 1 indicated by a vertical length in FIG. 3(a) is 2 to 8 mm, and a longitudinal length of the insert 1 indicated by a crosswise length in FIG. 3(a) is approximately 20 to 30 mm. The height of the insert 1 from the lower surface 3 to the upper surface 2, which is indicated by the vertical length in FIG. 3(b), is set to 4 to 10 mm depending on the crosswise length of the insert 1.

Other configurations are similar to those of the cutting insert 1 according to the foregoing first embodiment, and hence the descriptions thereof are omitted.

The insert 1 of the present embodiment is also capable of producing an operation advantage similar to that of the insert 1 of the first embodiment.

Alternatively in the insert 1 of the present embodiment, the top portions of the pair of minor protrusions may be set to be higher than the end cutting edge in the front view. In the insert 1 of the foregoing first embodiment, the top portions of the minor protrusions are set to be lower than the end cutting edge in the front view.

On this occasion, the distance between the end cutting edge to the upper end of the rising surface in the front view is preferably set to be large. This ensures that the chips generated by the end cutting edge are stably dischargeable to the outside under the cutting conditions over the wide range of feed rates.

That is, under the cutting condition of low feed rate, the chips are brought into collision with the pair of front protrusions and the pair of minor protrusions so as to produce the excellent chip discharge performance. Under the cutting condition of high feed rate, the chips are brought into collision with the pair of intermediate protrusions and the rear protrusion so as to produce the excellent chip discharge performance.

Modifications of the cutting insert according to the foregoing first or second embodiment are described below with reference to the drawings.
(First Modification)

Figure 8:
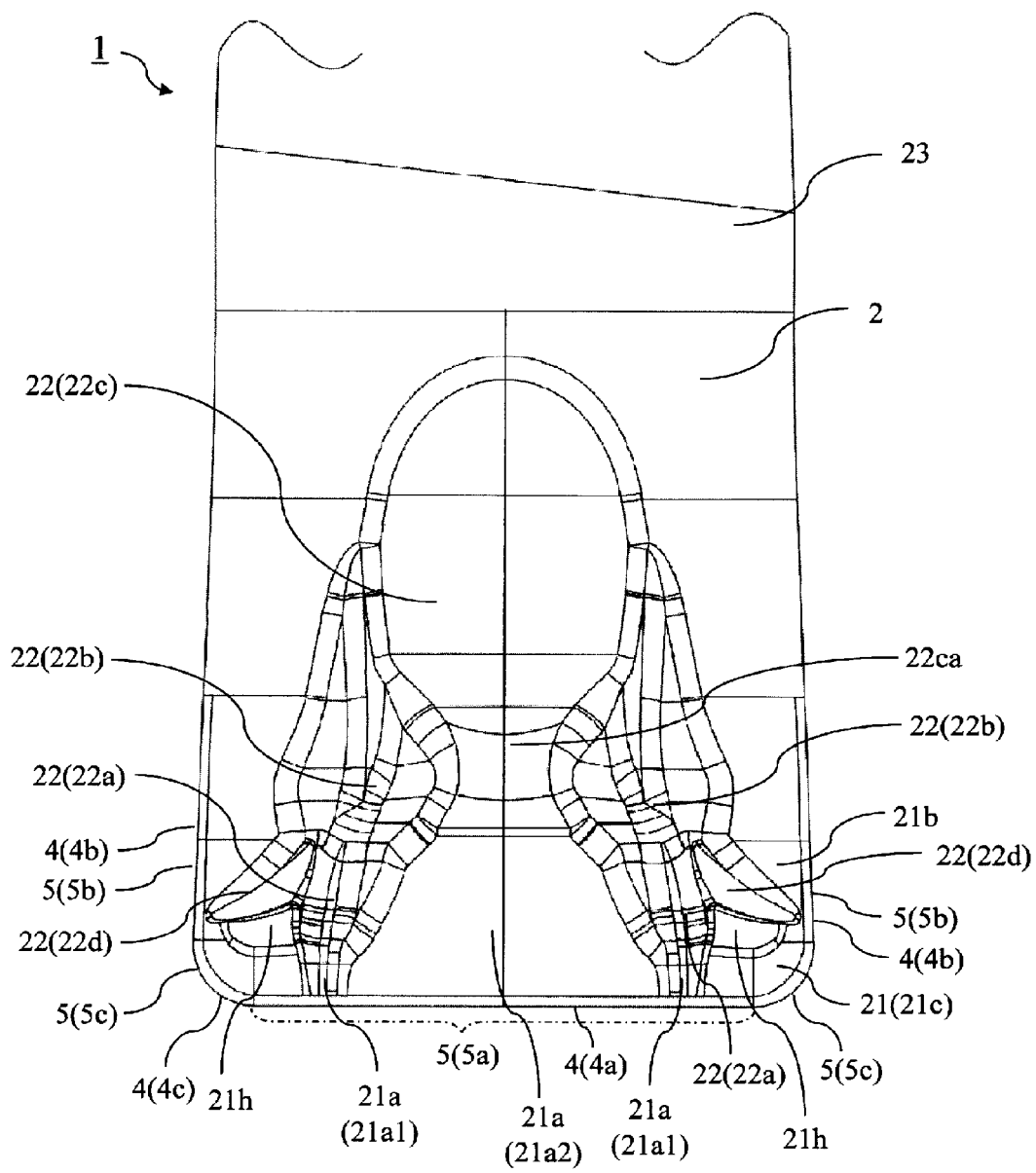
FIG. 8 is a top view showing a first modification of the cutting insert shown in FIG. 1.
Figure 9A:
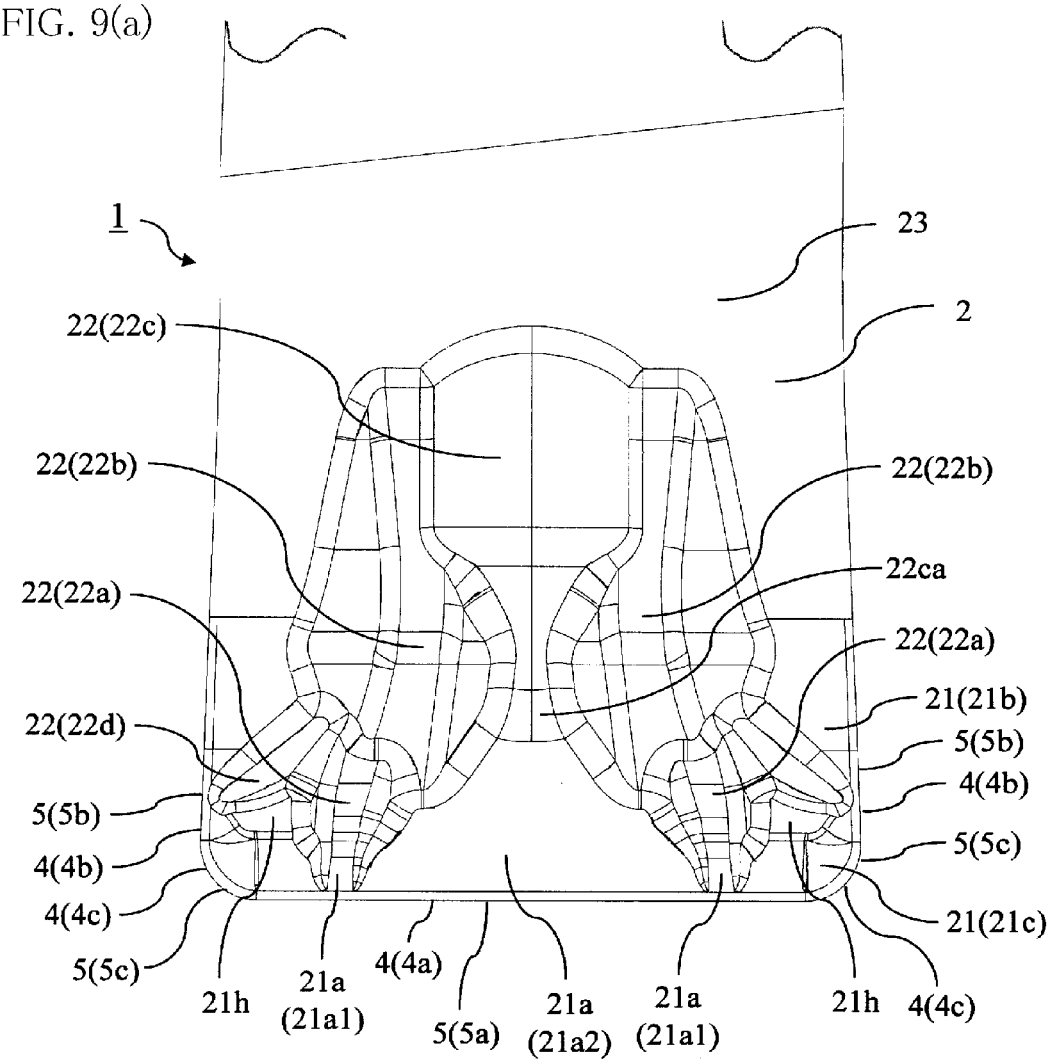
FIG. 9(a) is a top view thereof.
Figure 9B:
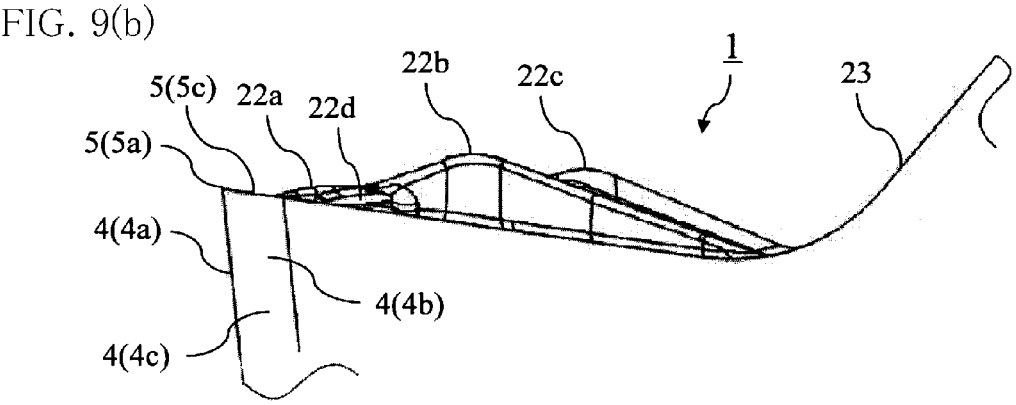
FIG. 9(b) is a side view thereof.

A first modification is described with reference to FIG. 8.

In the foregoing first and second embodiments, the rake surface 21 having the predetermined rake angle is located between each of the front protrusions 22a and each of the minor protrusions 22d on the upper surface 2. In the present modification, as shown in FIG. 8, flat parts 21h parallel to the horizontal plane are respectively located between the front protrusions 22a and the minor protrusions 22d. With this configuration, the discharge speed of the chips after flowing through the end rake surface 21a or the corner rake surface 21c is reduced upon contact with the flat part 21h. Hence, even the minor protrusions 22d having a lower height than the front protrusions 22a is capable of effectively performing chip discharge processing.

In the present modification, setting is made so that an end rake angle in a region between the end cutting edge 5a on the end rake surface 21a and the pair of front protrusions 22a (hereinafter referred to as a first region 21a1 for the sake of convenience) is smaller than an end rake angle of the end rake surface 21a in a region surrounded by the end cutting edge 5a on the end rake surface 21a and the pair of front protrusions 22a (hereinafter referred to as a second region 21a2 for the sake of convenience). Accordingly, the portion of the chip generated in the middle part of the end cutting edge 5a and the portion of the chip generated at the opposite ends thereof differ in discharge direction. This ensures facilitation of the deformation upon contact with the pair of front protrusions 22a or the like.

In the foregoing first and second embodiments, upper end surfaces 22a1 of the pair of front protrusions 22a have a convex curved-surface shape as shown in FIG. 5(a). In the present modification, upper end surfaces of the pair of front protrusions 22a have a planar shape. With this configuration, the chips are brought into contact with internal clearance surfaces of the pair of front protrusions 22a so as to stably squeeze the chips in the width direction thereof and appropriately control the discharge direction. Also in the present modification, the upper end surface of one of the pair of front protrusions 22a is inclined downward as approaching the other front protrusion 22a so that the upper end surfaces of the pair of front protrusions 22a face each other.

Other configurations are similar to those of the cutting insert 1 according to the foregoing first embodiment, and hence the descriptions thereof are omitted.

(Second Modification)

A second modification is described with reference to FIGS. 9 to 13.

In the foregoing first and second embodiments, the inclination angle θ2 of the pair of intermediate protrusions 22b is larger than the inclination angle θ1 of the pair of front protrusions 22a with respect to the reference line S in the top view. In the present modification, the inclination angle θ2 of the pair of intermediate protrusions 22b is smaller than the inclination angle θ1 of the pair of front protrusions 22a with respect to a straight line Sa parallel to the reference line S in the top view.

Figure 12A:
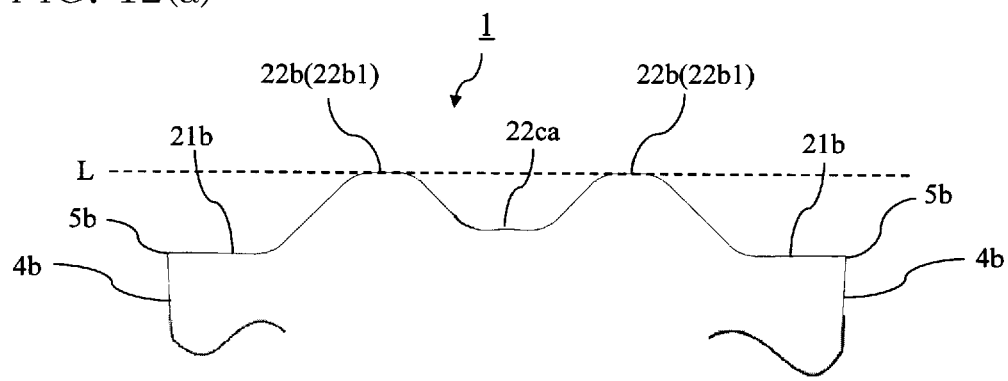
FIG. 12(a) is a cross-sectional view taken along line B1-B1 in FIG. 11.

In the foregoing first and second embodiments, the upper end surfaces 22b1 of the pair of intermediate protrusions 22b have the curved surface shape. In the present modification, the upper end surfaces 22b1 of the pair of intermediate protrusions 22b have a planar shape as shown in FIG. 12(a). The upper end surfaces 22b1 of the pair of intermediate protrusions 22b are also parallel to a horizontal line L. This ensures a large contact area between chips and the upper end surfaces 22b1 of the pair of intermediate protrusions 22b even when the chips have a relatively large width. This makes it difficult for the flow of the chips to shift to the left or right, thereby stabilizing the discharge direction.

Figure 12B:
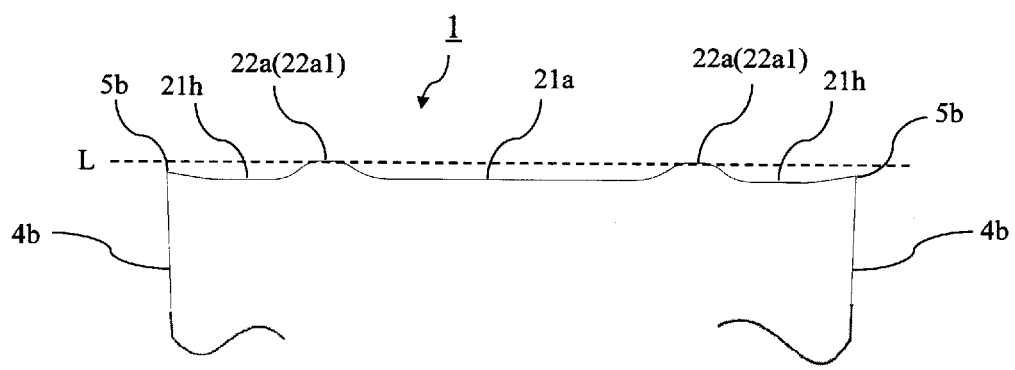
FIG. 12(b) is a cross-sectional view taken along line A1-A1 in FIG. 11.

In the present modification, the upper end surfaces 22a1 of the pair of front protrusions 22a are parallel to the horizontal line L as shown in FIG. 12(b). This further reduces the possibility that the flow of the chips shifts to the right or left, thus ensuring the stable discharge of the chips toward the perpendicular line of the front cutting edge 5a.

In the foregoing first and second embodiments, the rake angles of the rake surface 21 are, in the order of their decreasing angle, the rake angle of the end rake surface 21a, the rake angle of the corner rake surface 21c, and the rake angle of the side rake surface 21b. In the present modification, the rake angle of the corner rake angle 21c is larger than the rake angle of the end rake surface 21a.

In the present modification, setting is made so that the rake angle of the end rake surface 21a in opposite ends of the end cutting edge 5a is smaller than that in a region extending along a middle part of the end cutting edge 5a. Accordingly, the portion of the chip generated in the middle part of the end cutting edge 5a and the portions of the chip generated at the opposite ends differ in discharge direction. This ensures facilitation of the deformation upon contact with the pair of front protrusions 22a or the like.

For example, setting is made so that an end rake angle in a region between the end cutting edge 5a and the pair of front protrusions 22a (hereinafter referred to as a first region 21a1 for the sake of convenience) is smaller than an end rake angle in a region surrounded by the end cutting edge 5a and the pair of front protrusions 22a (hereinafter referred to as a second region 21a2 for the sake of convenience). For example, the rake angle in the second region 21a2 is set to 0 to 15°, and the rake angle in the first region 21a1 is set to 5 to 20°. The present modification is not provided with a horizontal plane, such as the boundary region 24 in the foregoing embodiment.

Figure 10:
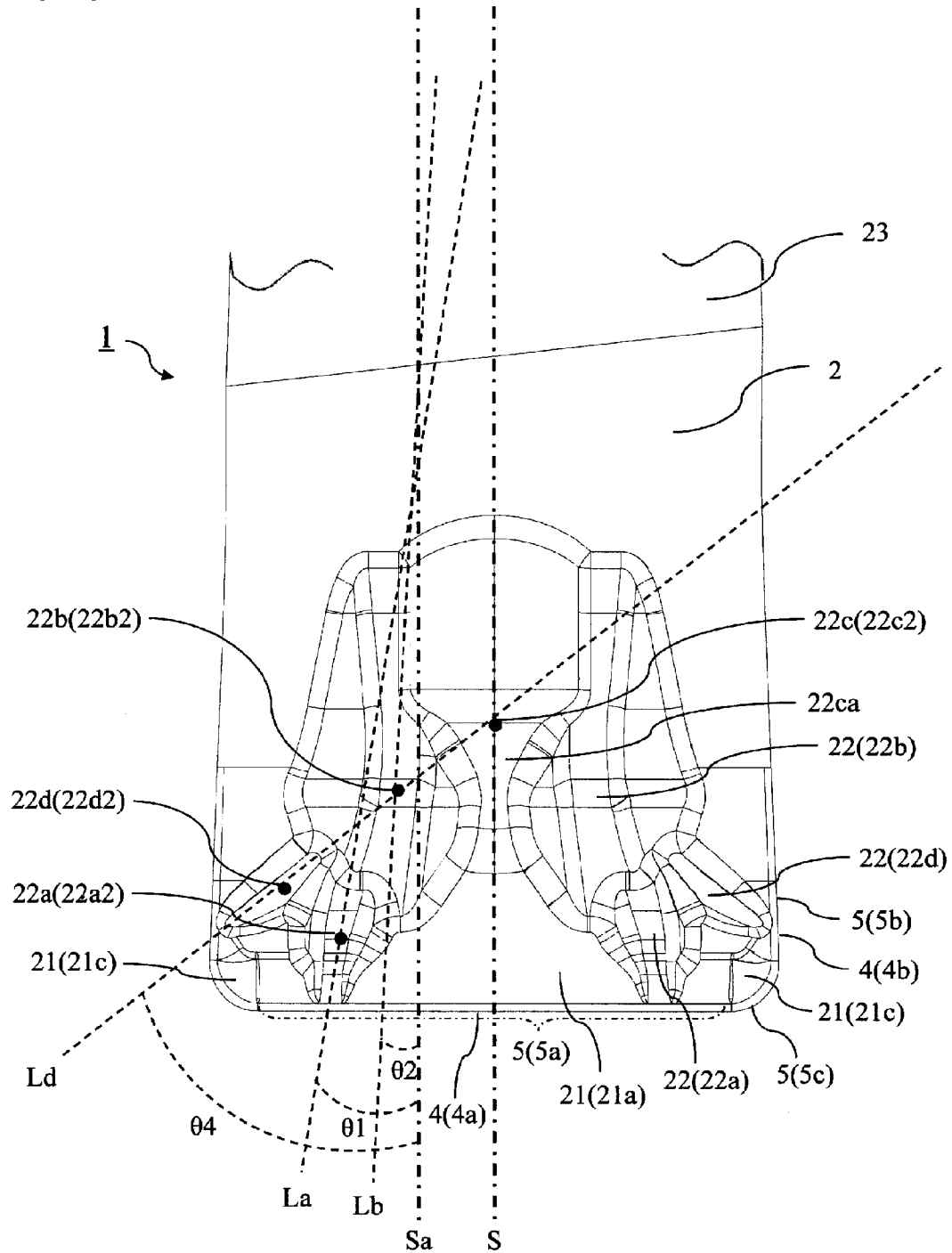
FIG. 10 is a top view of the insert shown in FIG. 9.
Figure 11:
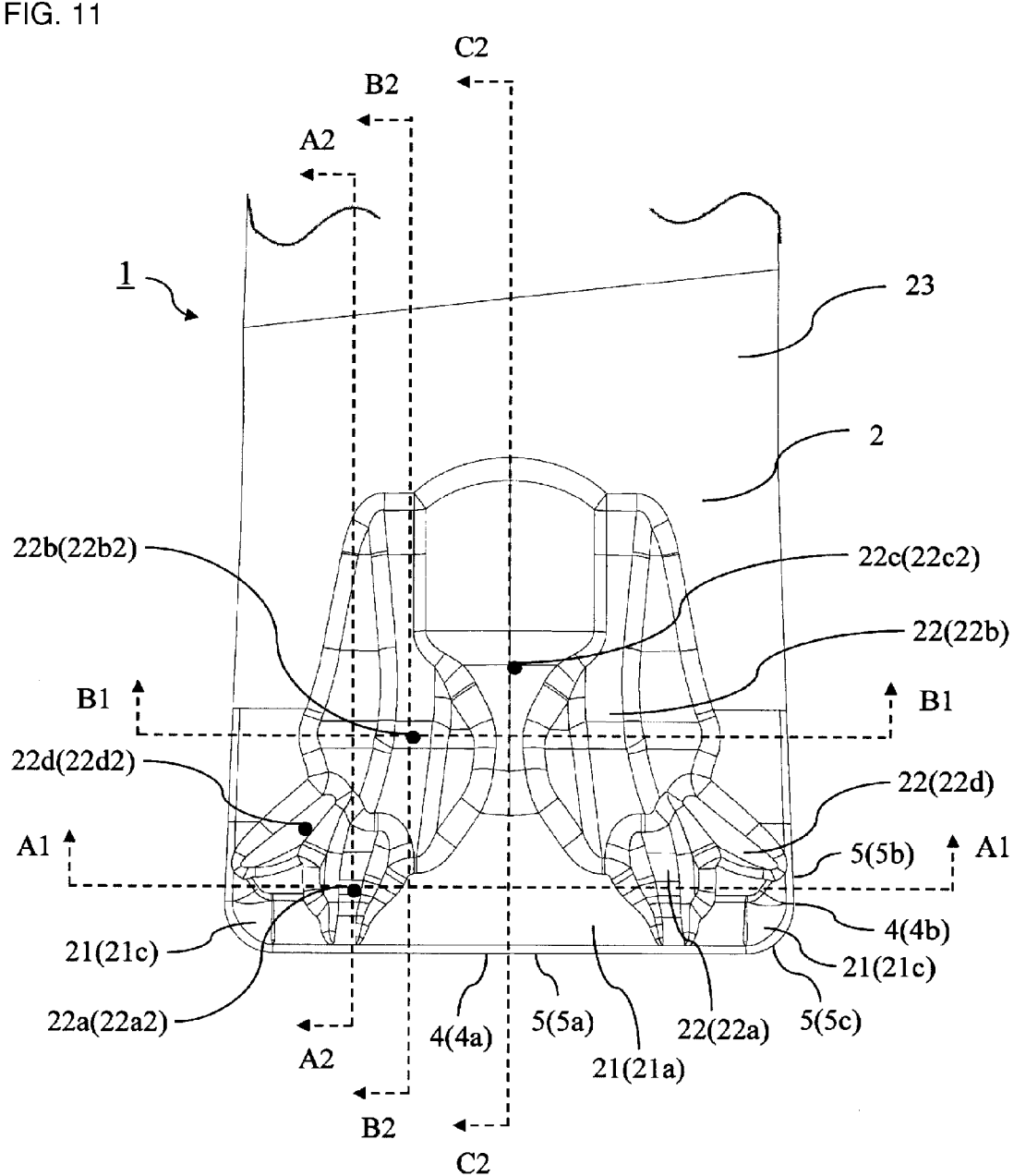
FIG. 11 is a top view of the insert shown in FIG. 9, namely, the top view showing the same region as in FIG. 10.
Figure 13A:
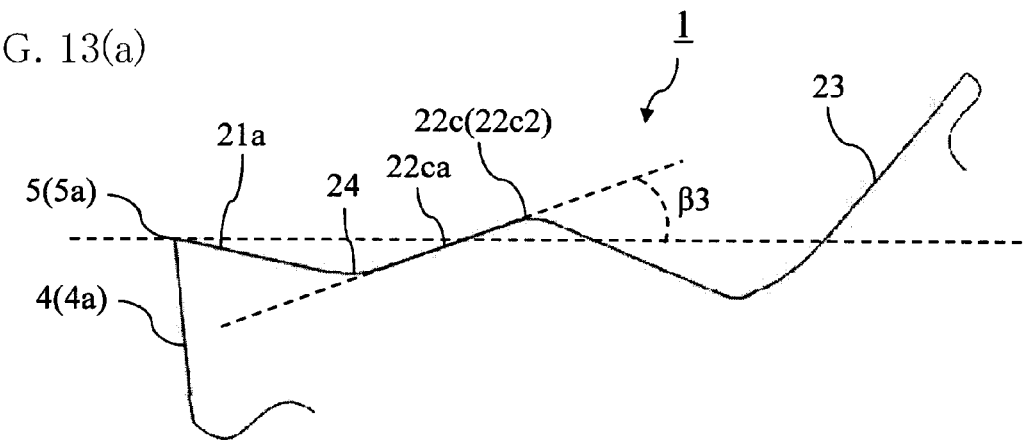
FIG. 13(a) is a cross-sectional view thereof taken along line C2-C2 in FIG. 11.
Figure 13B:
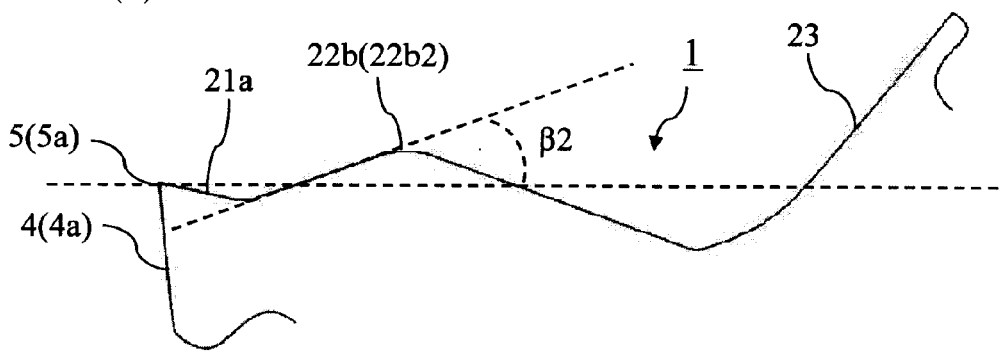
FIG. 13(b) is a cross-sectional view thereof taken along line B2-B2 in FIG. 11.
Figure 13C:
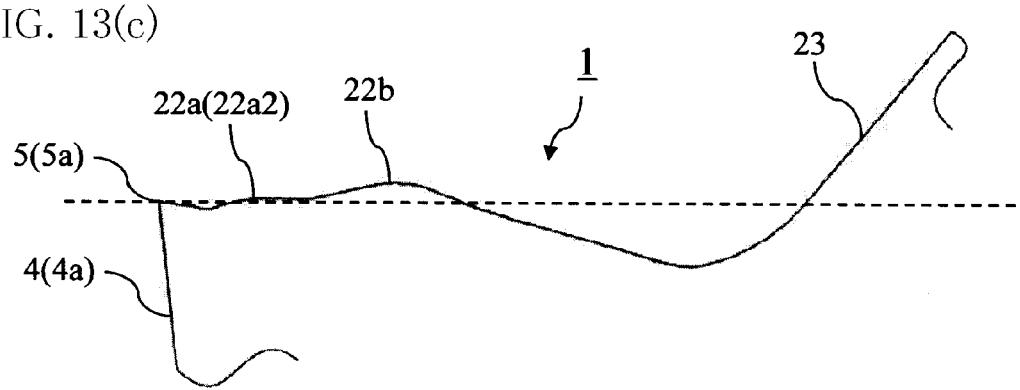
FIG. 13(c) is a cross-sectional view thereof taken along line A2-A2 in FIG. 11.

In the present modification, the pair of intermediate protrusions 22b is inclined upward as departing from the end cutting edge 5a. A climbing angle β3 of the ascent portion 22ca of the rear protrusion 22c is smaller than a climbing angle β2 of the pair of intermediate protrusions 22b. The climbing angle β3 of the ascent portion 22ca is shown in FIG. 13(a). The climbing angle β2 of the pair of intermediate protrusions 22b is shown in FIG. 13(b). The ascent portion 22ca of the rear protrusion 22c is located further apart from the end cutting edge 5a than the top portions 22b2 of the intermediate protrusions 22b as shown in FIG. 10.

Other configurations are similar to those of the cutting insert 1 according to the foregoing first embodiment or the cutting insert 1 according to the first modification, and hence the descriptions thereof are omitted.

Cutting Tool

First Embodiment

A cutting tool 10 according to a first embodiment of the present invention is described below with reference to FIGS. 14 to 16. The cutting tool 10 of the present embodiment is configured to attach thereto the insert 1 according to the foregoing first embodiment as a cutting insert.

Figure 14A:
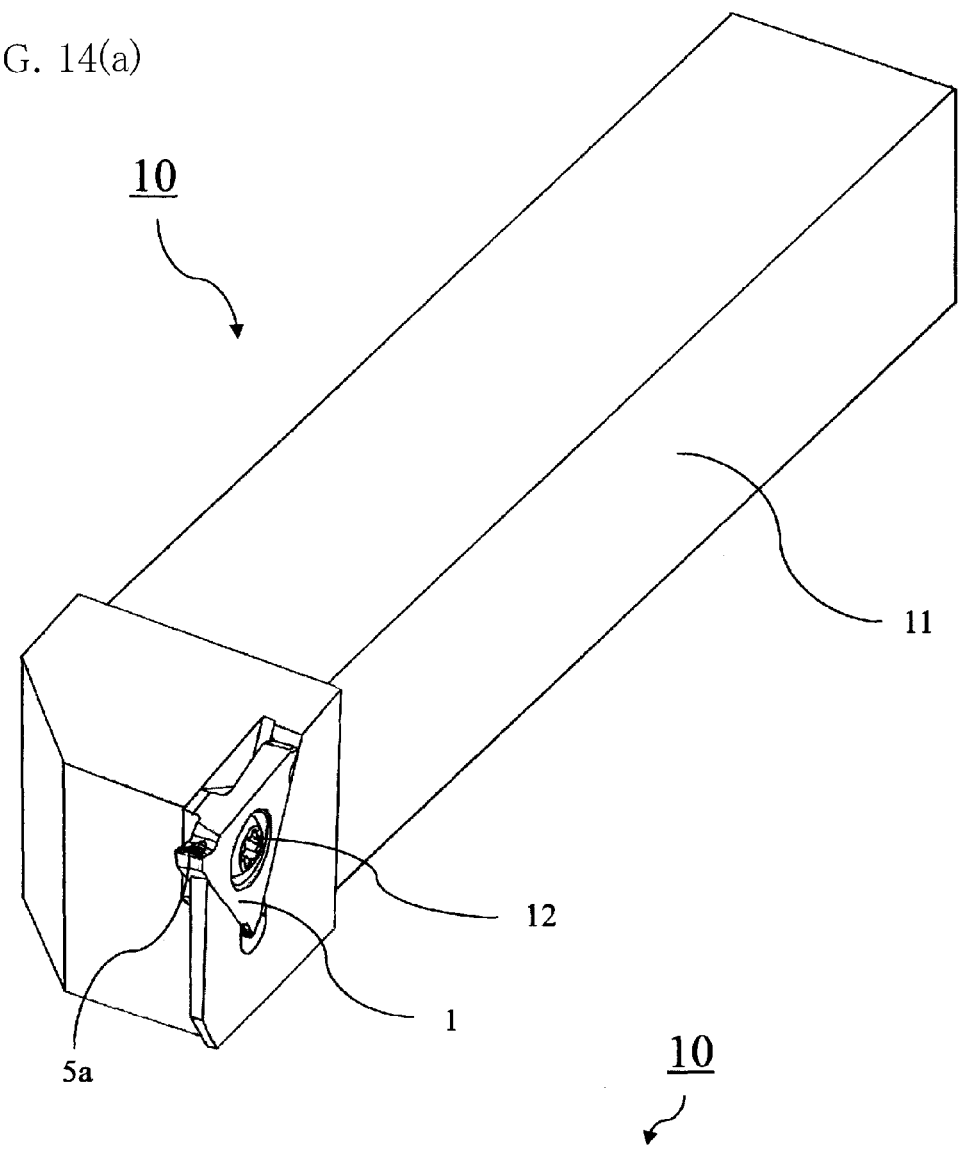
FIG. 14(a) is a perspective view thereof.
Figure 14B:
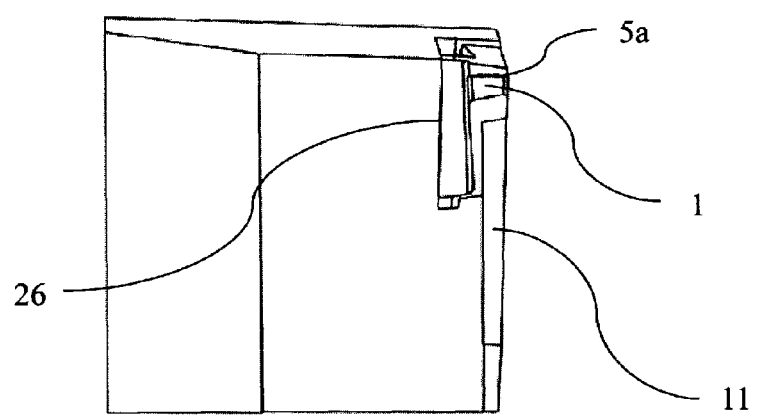
FIG. 14(b) is a front view thereof.
Figure 15A:
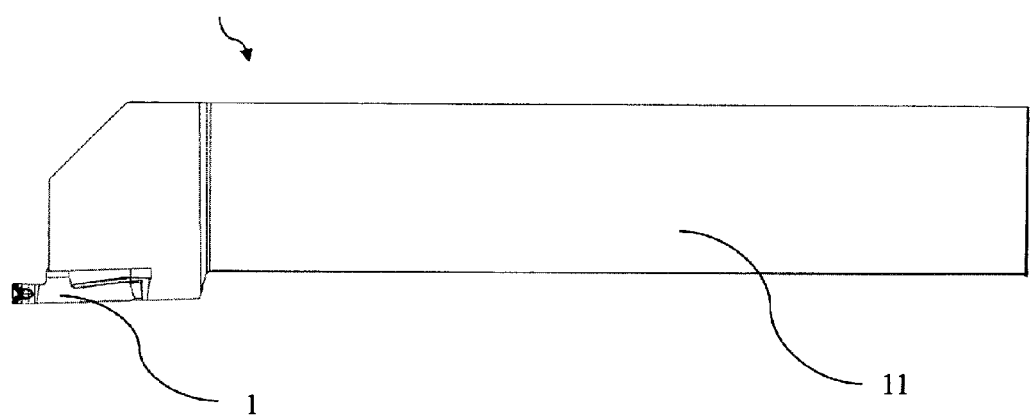
FIG. 15(a) is a top view of the cutting tool shown in FIG. 14.
Figure 15B:
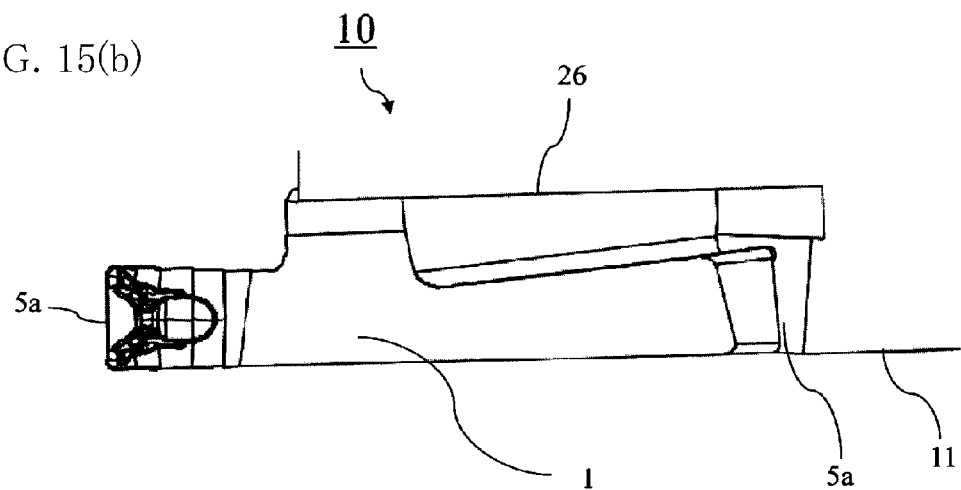
FIG. 15(b) is a partially enlarged view of FIG. 15(a)
Figure 16A:
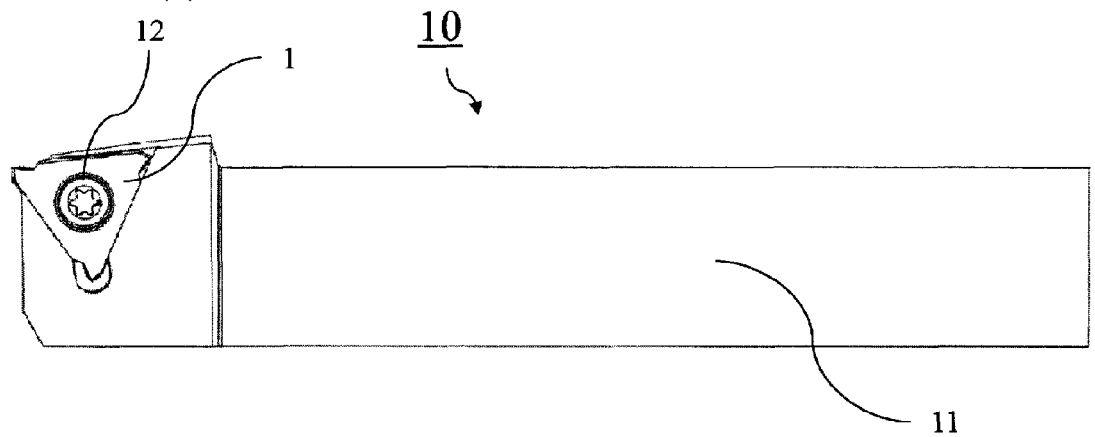
FIG. 16(a) is a side view of the cutting tool shown in FIG. 14.
Figure 16B:
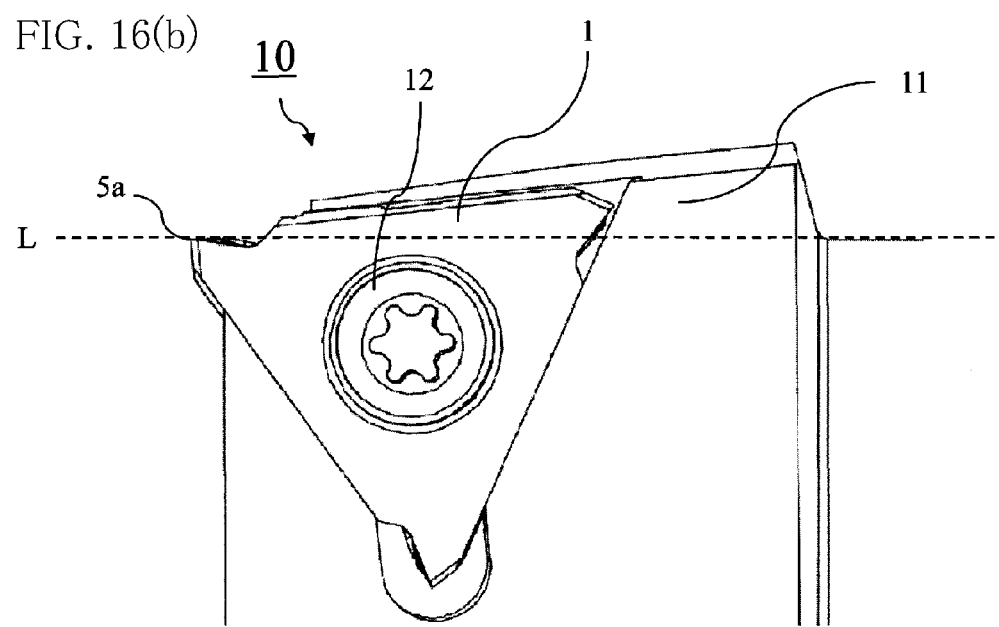
FIG. 16(b) is a partially enlarged view of FIG. 16(a)

FIG. 14 is a drawing showing the cutting tool 10 according to the first embodiment of the present invention. Specifically, FIG. 14(a) is a perspective view thereof, and FIG. 14(b) is a front view thereof. FIG. 15(a) is a top view of the cutting tool 10 shown in FIG. 14, and FIG. 15(b) is a top view showing an enlarged main part of the cutting tool 10 shown in FIG. 15(a). FIG. 16(a) is a side view of the cutting tool 10 shown in FIG. 14, and FIG. 16(b) is a side view showing an enlarged main part of the cutting tool 10 shown in FIG. 16(a).

As shown in FIG. 14, the cutting tool 10 of the present embodiment includes the insert 1 and an approximately prismatic-shaped holder 11 configured to hold the insert 1 at the front end thereof. The insert 1 is to be attached to the holder 11 so as to be held in a state in which the single end cutting edge 5a is protruded from the front end of the holder 11.

In the present embodiment, a fixing member (screw) 12 is inserted from the through hole of the insert 1 to the corresponding portion of the holder 11 in the front end of the holder 11. The present embodiment employs a method in which the constraint force exerted on the insert 1 by the fixing member (screw) 12 is adjusted and the insert 1 is held down from the opposite side of the attachment surface 26 so as to be constrained by the holder 11. When being constrained, the mounting surface 26 of the insert 1 is contacted with the mounting surface of the holder 11.

Second Embodiment

A cutting tool 10 according to a first embodiment of the present invention is described below with reference to FIGS. 17 to 19 by illustrating the cutting tool configured to attach thereto the insert 1 according to the foregoing second embodiment.

In FIGS. 17 to 19, the same components as in the foregoing FIGS. 14 to 16 are provided with identical reference numerals, and the descriptions thereof are generally omitted. A part of the configuration of the cutting tool 10 of the present embodiment, such as the attachment state of the cutting insert 1, is identical to that of the cutting tool 10 of the first embodiment. Therefore, the following description is focused on differences from the cutting tool 10 of the first embodiment, and the descriptions of overlapping contents are omitted.

Figure 17A:
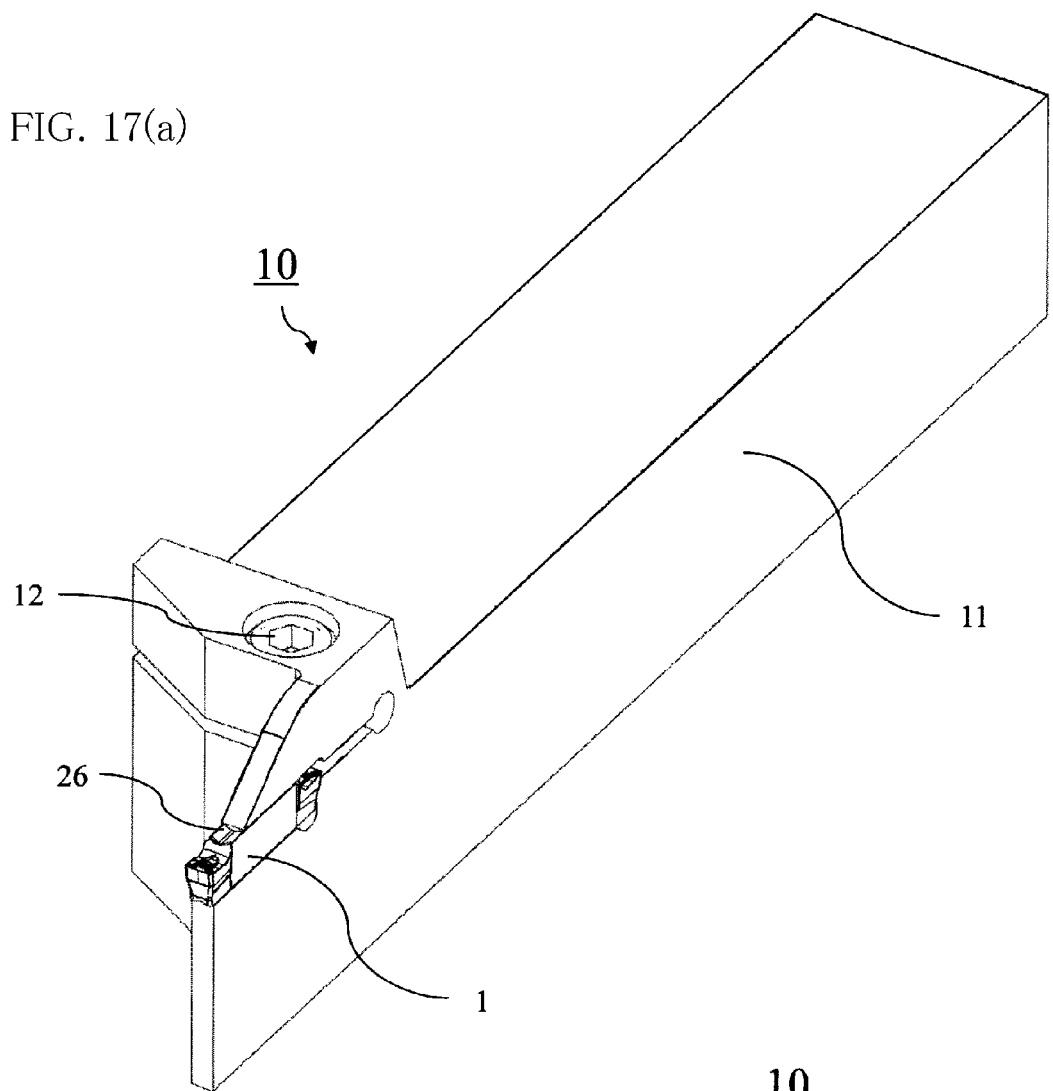
FIG. 17(a) is a perspective view thereof.
Figure 17B:
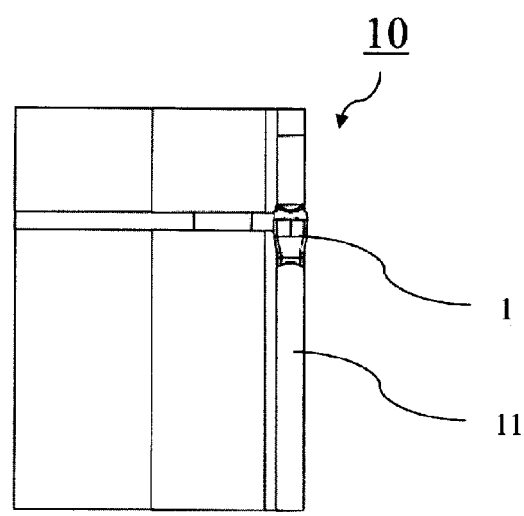
FIG. 17(b) is a front view thereof.
Figure 18A:
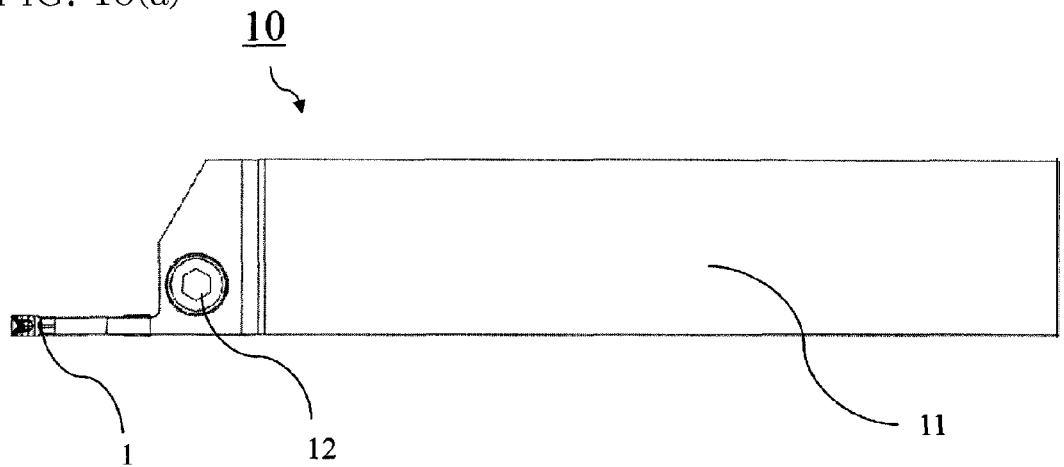
FIG. 18(a) is a top view of the cutting tool shown in FIG. 17.
Figure 18B:
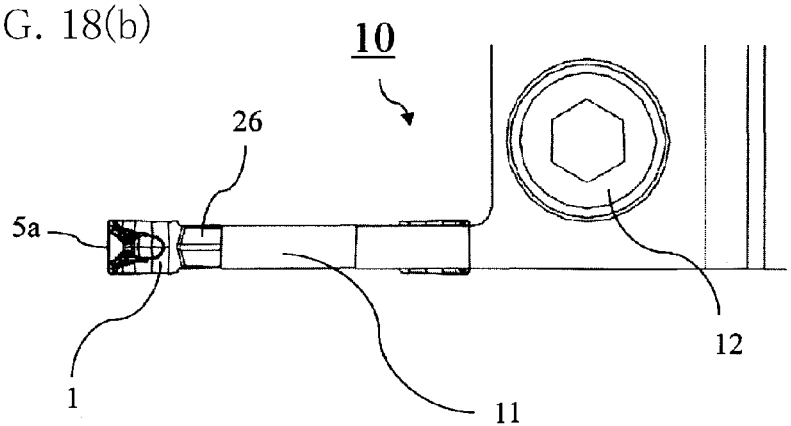
FIG. 18(b) is a partially enlarged top view of FIG. 18(a)
Figure 19A:
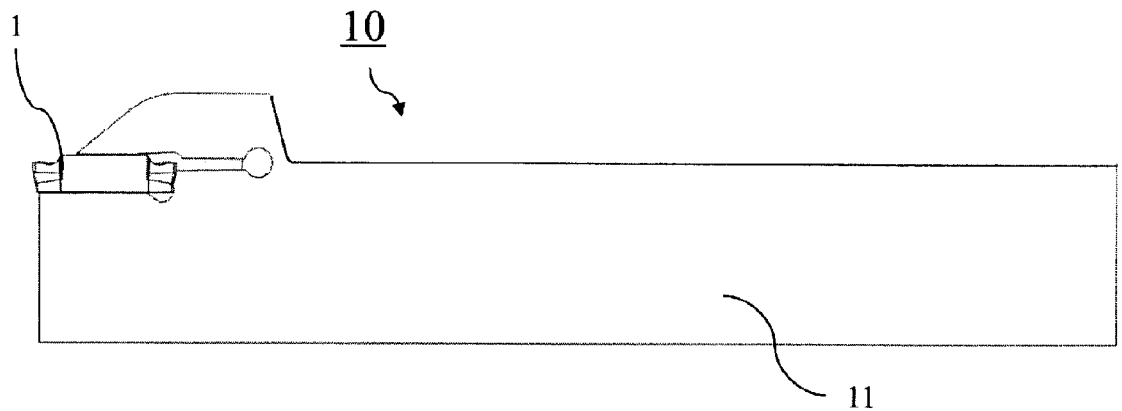
FIG. 19(a) is a side view of the cutting tool shown in FIG. 17.
Figure 19B:
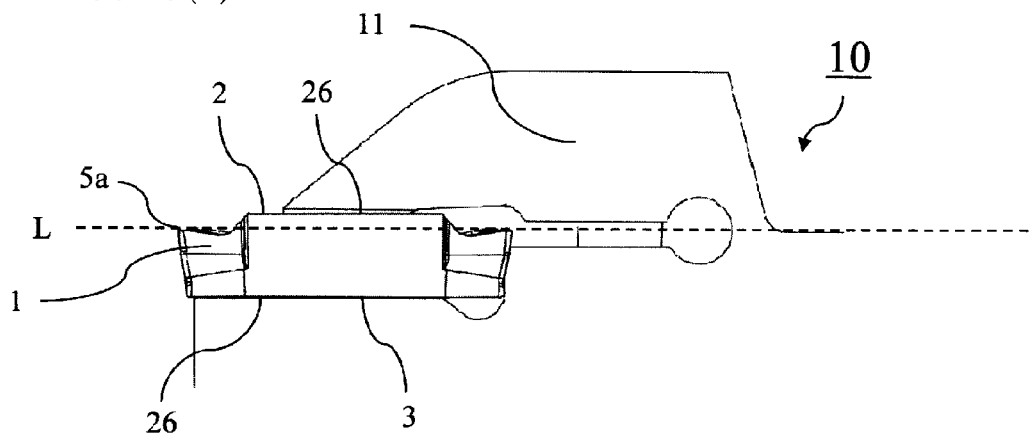
FIG. 19(b) is a partially enlarged side view of FIG. 19(a)

FIG. 17 is a drawing showing the cutting tool 10 according to the second embodiment of the present invention. Specifically, FIG. 17(a) is a perspective view thereof, and FIG. 17(b) is a front view thereof. FIG. 18(a) is a top view of the cutting tool 10 shown in FIG. 17, and FIG. 18(b) is a top view showing an enlarged main part of the cutting tool 10 shown in FIG. 18(a). FIG. 19(a) is a side view of the cutting tool 10 shown in FIG. 17, and FIG. 19(b) is a side view showing an enlarged main part of the cutting tool 10 shown in FIG. 19(a).

The cutting tool 10 of the present embodiment includes the insert 1 and an approximately prismatic-shaped holder 11 configured to screw the insert 1 into the front end thereof.

As shown in FIG. 17, the present embodiment employs a "clamp-on method" in which the constraint force by a fixing member (screw) 12 is adjusted in the front end of the holder 11 and the insert 1 is held from above and below by an upper jaw and a lower jaw in a front end part of the holder 11 so as to be constrained by the holder 11. When being constrained, the mounting surfaces 26 (clamp surfaces) of the upper surface 2 and the lower surface 3 of the insert 1 are respectively contacted with the upper jaw and the lower jaw of the holder 11.

Other configurations are similar to those of the cutting tool 10 according to the first embodiment, and hence the descriptions thereof are omitted.

The cutting tool 10 of the present embodiment is also capable of producing an operation advantage similar to that of the cutting tool 10 of the first embodiment.

The methods employed in the foregoing embodiments may be replaced with another method. Specifically, as another method of constraining the insert 1 by the holder, there are, for example, "lever lock method" and "cam lock method". With the lever lock method, a hole is bored in the insert, and the holder includes an approximately L-shaped lever. The insert can be constrained by the holder from an inner wall of the hole of the insert by the lever using leverage. With the cam lock method, a hole is bored in the insert, and a pin whose shank part and head part are eccentric to each other is used. The pin is to be inserted into the hole of the insert so as to constrain the insert by the holder.

Method of Producing Machined Product

First Embodiment

A method of producing a machined product according to a first embodiment of the present invention is described below with reference to FIG. 20 by illustrating the case where the cutting tool 10 having the insert 1 of the second embodiment attached thereto is applied to "the cut-off process."

The method of producing the machined product according to the present embodiment includes the following steps (i) to (iv).

Figure 20A:
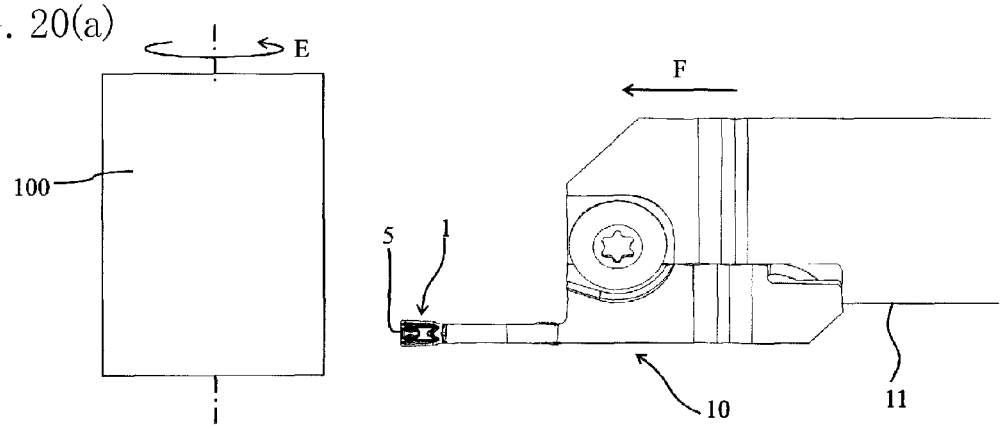
FIG. 20 is a schematic diagram showing a method of producing a machined product according to a first embodiment of the present invention.

The step (i) is to rotate a workpiece 100 in an arrowed direction E as shown in FIG. 20(a).

The step (ii) is to rotate the cutting tool 10 in an arrowed direction F as shown in FIG. 20(a) so as to bring the cutting tool 10 into a close contact with the workpiece 100 being rotated.

In this step, the workpiece 100 and the cutting tool 10 need to approach each other. For example, the workpiece 100 may be brought near the cutting tool 10.

Figure 20B:
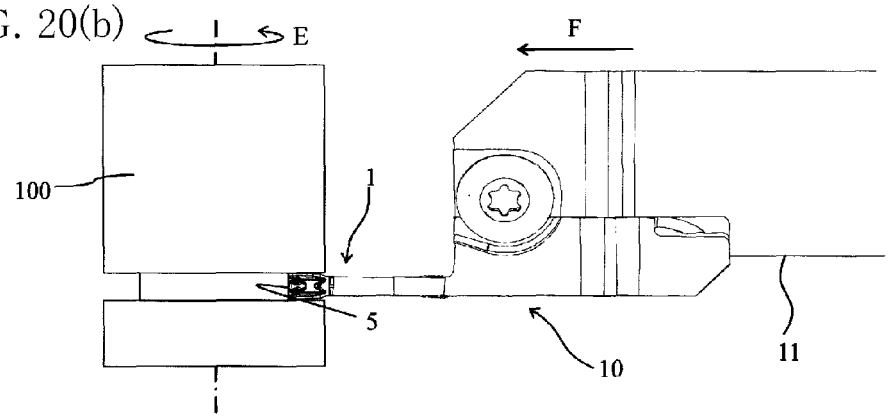

The step (iii) is to bring the cutting edge 5 of the cutting tool 10 into contact with the workpiece 100 being rotated so as to cut the workpiece 100 as shown in FIG. 20(b).

In this step, in a grooving process, the cutting tool 10 is moved in the arrowed direction F until the workpiece 100 is divided, so as to perform cutting, thus achieving a cut-off process. In FIG. 20(b), the workpiece 100 is to be cut using the end cutting edge as the cutting edge 5, but not limited thereto. In order to cut the workpiece 100, any one of the end cutting edge, the pair of side cutting edges, and the corner cutting edges described earlier may be brought into contact with the workpiece 100 being rotated.

Figure 20C:
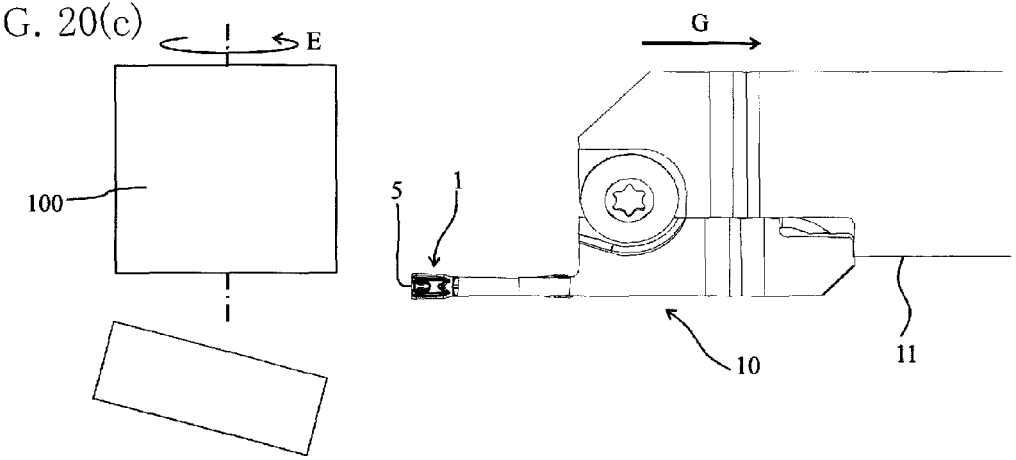

The step (iv) is to move the cutting tool 10 in an arrowed direction G so as to separate the cutting tool 10 from the workpiece 100 being divided, as shown in FIG. 20(c).

In this step, the workpiece 100 and the cutting tool 10 need to separate from each other. For example, the workpiece 100 may be separated from the cutting tool 10.

The machined product is obtainable by performing the foregoing steps (i) to (iv).

According to the present embodiment, as described earlier, the pair of front protrusions, the pair of intermediate protrusions and the rear protrusion are sequentially located as departing from the end cutting edge on the upper surface of the cutting insert 1. Furthermore, the top portions of the pair of intermediate protrusions are higher than the top portions of the pair of front protrusions and the top portion of the rear protrusion. With this configuration, the chips generated by the end cutting edge when the workpiece is subjected to the grooving process and the cut-off process are brought into contact with each of these protrusions while passing through the end rake surface so as to be deformed. Consequently, the chips are stably dischargeable to the outside under cutting conditions over the wide range of feed rates.

When the cutting process is further continued, it is required to repeat the step of bringing the cutting edge 5 of the cutting tool 10 into contact with different portions of the workpiece 100 while holding the rotation of the cutting tool 100. The insert 1 used in the present embodiment is configured to be usable at two corners. Therefore, when the cutting edge 5 being used is worn, an unused cutting edge 5 may be used.

When the workpiece 100 is subjected to a mere grooving process instead of the foregoing cut-off process, the cutting process may be performed by bringing the cutting tool 10 into contact with the region until which the workpiece 100 remains undivided. The insert 1 according to the present embodiment has the straight line shape when viewed from the front clearance surface, thereby forming the bottom surface of the groove with high smoothness during the grooving process.

Second Embodiment

A method of producing a machined product according to a second embodiment of the present invention is described below with reference to FIG. 21 by illustrating the case where the cutting tool 10 having the insert 1 of the second embodiment attached thereto is applied to "the chamfering process."

In FIG. 21, the same components as in the foregoing FIG. 20 are provided with identical reference numerals, and the descriptions thereof are generally omitted. The method of producing the machined product of the present embodiment includes the steps, some of which are identical with those in the method of producing the machined product of the first embodiment. Therefore, the following description is focused on differences from the method of producing the machined product of the first embodiment, and the descriptions of overlapping contents are omitted.

The method of producing the machined product according to the present embodiment includes the following steps (i) to (vii).

Figure 21A:
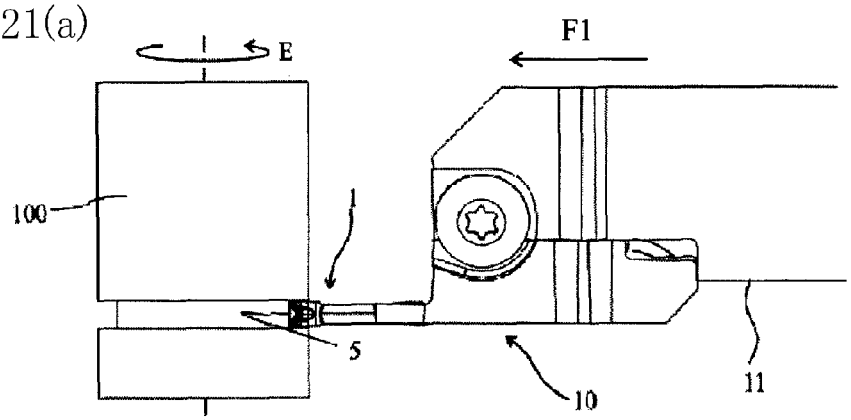
FIG. 21 is a schematic diagram showing a method of producing a machined product according to a second embodiment of the present invention.

The step (i) is to rotate a workpiece 100 in an arrowed direction E as shown in FIG. 21(a).

The step (ii) is to move the cutting tool 10 in an arrowed direction F1 so as to bring the cutting tool 10 into a close contact with the workpiece 100 being rotated, as shown in FIG. 21(a).

In this step, the workpiece 100 and the cutting tool 10 need to approach each other. For example, the workpiece 100 may be brought near the cutting tool 10.

The step (iii) is to further move the cutting tool 10 in the arrowed direction F1 and bring the cutting edge 5 of the cutting tool 10 into contact with the workpiece 100 being rotated so as to cut the workpiece 100 as shown in FIG. 21(a).

In this step, a cutting process of forming a groove is performed in a grooving process.

Figure 21B:
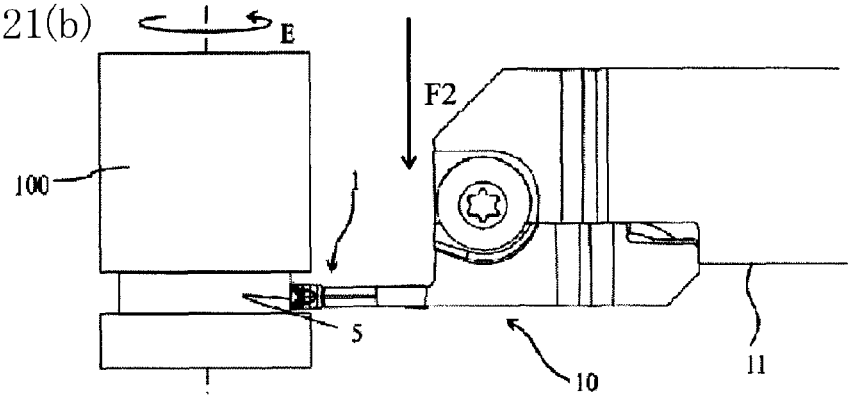

The step (iv) is to move the cutting tool 10 in an arrowed direction F2 and bring the cutting edge 5 of the cutting tool 10 into contact with the workpiece 100 being rotated so as to cut the workpiece 100 as shown in FIG. 21(b).

In this step, a traversing process of increasing the width of the groove is performed in the grooving process.

Figure 21C:
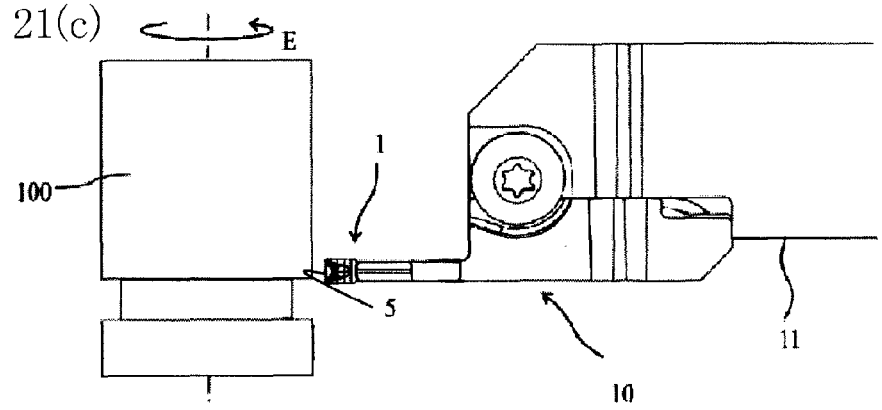

The step (v) is to separate the cutting tool 10 from the workpiece 100 after being cut, as shown in FIG. 21(c).

Figure 21D:
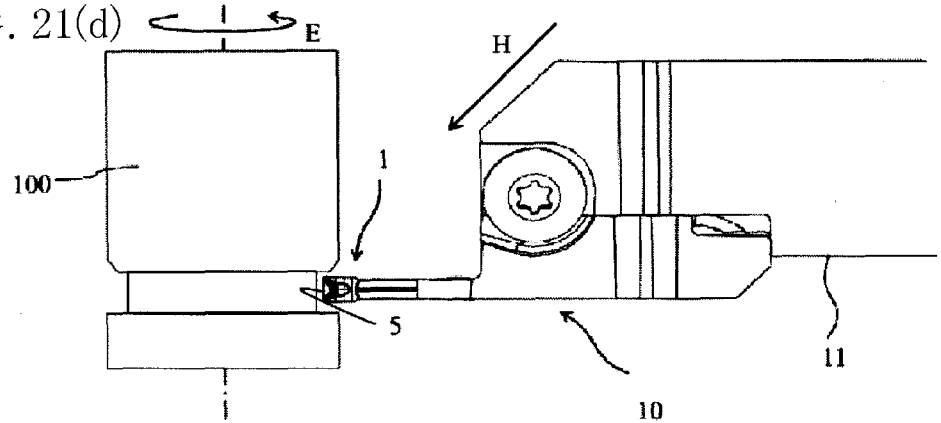

The step (vi) is to move the cutting tool 10 in an arrowed direction H and bring the cutting edge 5 of the cutting tool 10 into contact with the workpiece 100 being rotated so as to cut the workpiece 100 as shown in FIG. 21(d).

In this step, the workpiece 100 and the cutting tool 10 need to depart from each other. For example, the workpiece 100 may be separated from the cutting tool 10.

The step (vii) is to move the cutting tool 10 in the opposite direction of the arrowed direction F1 so as to separate the cutting tool 10 from the workpiece 100.

The machined product is obtainable by performing the foregoing steps (i) to (vii).

Also in the present embodiment, as described earlier, the pair of front protrusions, the pair of intermediate protrusions and the rear protrusion are sequentially located as departing from the end cutting edge on the upper surface of the cutting insert 1. Furthermore, the top portions of the pair of intermediate protrusions are higher than the top portions of the pair of front protrusions and the top portion of the rear protrusion. This ensures that the chips generated by the end cutting edge in the grooving process of the steps (i) to (v) are deformed upon contact with the individual protrusions while passing along the end rake surface. Consequently, the chips are stably dischargeable to the outside under cutting conditions over the wide range of feed rates.

In the present embodiment, the foregoing steps (i) to (v) are optional, and the step (vi) and (vii) may be performed from a state in which the step (v) is terminated.

Other features are similar to those of the method of producing the machined product according to the first embodiment, and hence the descriptions thereof are omitted.

While the embodiments of the present invention have been illustrated, the present invention is not limited to the foregoing embodiments. The present invention is applicable to any optional one unless departing from the gist of the present invention.

For example, the foregoing embodiment is configured to include the pair of minor protrusions 22d that are located close to their adjacent side clearance surface 4b of the pair of side clearance surfaces 4b with respect to the pair of front protrusions 22a. Instead of this, the pair of front protrusions 22a may be configured to be continuous with the intersection of the pair of side clearance surfaces 4b and the upper surface 2 in the top view. On this occasion, there is no need to dispose the pair of minor protrusions 22d.

As an alternate configuration, the width of the end cutting edge 5a may be reduced by removing the cutting sections I of the foregoing embodiment to the midst of the rising surface 23 along the pair of side clearance surfaces 4b by means of polishing or the like. Similarly to the foregoing embodiment, the pair of front protrusions 22a, the pair of intermediate protrusions 22b and the rear protrusion 22c are sequentially located as departing from the end cutting edge 5a on the upper surface 2 in this configuration. The top portions 22b2 of the pair of intermediate protrusions 22b are higher than the top portions 22a2 of the pair of front protrusions 22a and the top portion 22c2 of the rear protrusion 22c. It is therefore possible to produce an operation advantage similar to that of the foregoing embodiment.

When polishing the cutting sections I to the midst of the rising surface 23 along the pair of side clearance surfaces 4b in this configuration, a polishing end portion close to the rising surface 23 may be configured to be inclined with respect to the end cutting edge La in the top view besides reducing the width of the end cutting edge 5a. This ensures that the workpiece is subjected to the grooving process using the end cutting edge 5a and to the chamfering process using the inclined polishing end portion close to the rising surface 23 during a single step of the cutting process.

DESCRIPTION OF THE REFERENCE NUMERAL

1: cutting insert
2: upper surface
21: rake surface
21a: end rake surface
21a1: first region
21a2: second region
α1: rake angle
21b: side rake surface
α2: rake angle
21c: corner rake surface
21h: flat part
22: protrusion
22a: front protrusion
β1: climbing angle
θ1: inclination angle
22a1: upper end surface
22a2: top portion
22b: intermediate protrusion
β2: climbing angle
θ2: inclination angle
22b1: upper end surface
22b2: top portion 22c: rear protrusion
22ca: ascent portion
β3: climbing angle
22c2: top portion
22d: minor protrusion
β4: climbing angle
θ4: inclination angle
22d2: top portion
23: rising surface
γ: climbing angle
24: boundary region
26: attachment surface (clamp surface)
3: lower surface
4: side surface
4a: front clearance surface
4b: side clearance surface
4c: corner clearance surface
5: cutting edge
5a: end cutting edge
5b: side cutting edge
5c: corner cutting edge
6: through hole
I: cutting section
II: mounting section (clamp section)
L: horizontal line
S: reference line
10: cutting tool
11: holder
12: fixing member (screw)
100: workpiece

The invention claimed is:

1. A cutting insert, comprising:
an upper surface;
a side surface comprising a front clearance surface and a pair of side clearance surfaces adjacent to the front clearance surface; and
an end cutting edge located along an intersection of the upper surface and the front clearance surface,
wherein the upper surface comprises
an end rake surface that is continuous with the end cutting edge and is inclined downward as departing from the end cutting edge,
a pair of front protrusions that is located apart from the end cutting edge and are less apart from each other as departing from the end cutting edge in a top view,
a rear protrusion which is further apart from the end cutting edge than the pair of front protrusions in the top view, and which is located in a region between the pair of front protrusions in a side view taken from the front clearance surface, the rear protrusion comprising an ascent portion inclined upward as departing from the end cutting edge, and
a pair of intermediate protrusions that is at least partially located between the pair of front protrusions and the rear protrusion in the top view, and
wherein top portions of the pair of intermediate protrusions are respectively located between the pair of front protrusions and the rear protrusion, and are higher than top portions of the front protrusions and a top portion of the rear protrusion.

2. The cutting insert according to claim 1, wherein a first perpendicular line of the end cutting edge which passes through the top portions of the pair of front protrusions, a second perpendicular line of the end cutting edge which passes through the top portions of the pair of intermediate protrusions, and a third perpendicular line of the end cutting edge which passes through the top portion of the rear protrusion are sequentially located from opposite ends of the end cutting edge to a middle part thereof in the top view.

3. The cutting insert according to claim 1, wherein the pair of intermediate protrusions is less apart from each other as departing from the end cutting edge.

4. The cutting insert according to claim 3, wherein an inclination angle of the pair of intermediate protrusions is larger than an inclination angle of the pair of front protrusions with respect to a reference line that is a perpendicular line of the end cutting edge and passes through a midpoint of end portions of the pair of front protrusions which are close to the end cutting edge in the top view.

5. The cutting insert according to claim 3, wherein an inclination angle of the pair of intermediate protrusions is smaller than an inclination angle of the pair of front protrusions with respect to a reference line that is a perpendicular line of the end cutting edge and passes through a midpoint of end portions of the pair of front protrusions which are close to the end cutting edge in the top view.

6. The cutting insert according to claim 5, wherein upper surfaces of the pair of intermediate protrusions respectively have a planar shape.

7. The cutting insert according to claim 6, wherein the upper surfaces of the pair of intermediate protrusions are respectively a horizontal surface.

8. The cutting insert according to claim 1,
wherein the pair of front protrusions and the pair of intermediate protrusions are inclined upward as departing from the end cutting edge, and
wherein a climbing angle of the pair of front protrusions is smaller than a climbing angle of the pair of intermediate protrusions.

9. The cutting insert according to claim 1,
wherein the pair of intermediate protrusions is inclined upward as departing from the end cutting edge, and
wherein a climbing angle of the ascent portion of the rear protrusion is smaller than a climbing angle of the pair of intermediate protrusions.

10. The cutting insert according to claim 1, wherein the top portions of the pair of intermediate protrusions are higher than the end cutting edge.

11. The cutting insert according to claim 1,
wherein the ascent portion of the rear protrusion is located further apart from the end cutting edge than the end rake surface, and
wherein a boundary region of the end rake surface and the ascent portion of the rear protrusion is located between the pair of intermediate protrusions in the top view.

12. The cutting insert according to claim 1, wherein the pair of front protrusions is continuous with an intersection of the pair of side clearance surfaces and the upper surface in the top view.

13. A cutting tool, comprising:
the cutting insert according to claim 1; and
a holder configured to attach the cutting insert thereto.

14. A method of producing a machined product, comprising:
bringing the end cutting edge of the cutting tool according to claim 1 into contact with a workpiece being rotated; and
separating the cutting tool and the workpiece from each other.

* * * * *